(12) United States Patent
Sharifi et al.

(10) Patent No.: US 11,749,284 B2
(45) Date of Patent: Sep. 5, 2023

(54) DYNAMICALLY ADAPTING ON-DEVICE MODELS, OF GROUPED ASSISTANT DEVICES, FOR COOPERATIVE PROCESSING OF ASSISTANT REQUESTS

(71) Applicant: Google LLC, Mountain View, CA (US)

(72) Inventors: Matthew Sharifi, Kilchberg (CH); Victor Carbune, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 209 days.

(21) Appl. No.: 17/098,013

(22) Filed: Nov. 13, 2020

(65) Prior Publication Data

US 2022/0157318 A1 May 19, 2022

(51) Int. Cl.
| | | |
|---|---|---|
| G10L 15/30 | (2013.01) | |
| G10L 15/00 | (2013.01) | |
| G10L 15/06 | (2013.01) | |
| G10L 15/22 | (2006.01) | |

(52) U.S. Cl.
CPC ............ *G10L 15/30* (2013.01); *G10L 15/005* (2013.01); *G10L 15/063* (2013.01); *G10L 15/22* (2013.01); *G10L 2015/223* (2013.01)

(58) Field of Classification Search
CPC ..... G10L 15/30; G10L 15/005; G10L 15/063; G10L 15/22; G10L 2015/223; G10L 15/32; G06F 3/167; G06F 704/27
See application file for complete search history.

(56) References Cited

U.S. PATENT DOCUMENTS

| | | | |
|---|---|---|---|
| 9,229,623 B1* | 1/2016 | Penilla | G06F 3/0362 |
| 10,210,003 B2* | 2/2019 | Ducatelle | G10L 15/08 |
| | | | 704/231 |
| 10,536,286 B1* | 1/2020 | Leblang | G10L 13/00 |
| 10,970,062 B2* | 4/2021 | Amiga | G06F 8/65 |
| 2004/0148164 A1* | 7/2004 | Baker | G10L 15/08 |
| | | | 704/231 |

(Continued)

FOREIGN PATENT DOCUMENTS

WO 2018208506 11/2018

OTHER PUBLICATIONS

European Patent Office; International Search Report and Written Opinion of App. No. PCT/US2020/064626; 13 pages; dated Jul. 14, 2021.

*Primary Examiner* — Fariba Sirjani
(74) *Attorney, Agent, or Firm* — Gray Ice Higdon

(57) ABSTRACT

Implementations are directed to dynamically adapting which assistant on-device model(s) are locally stored at assistant devices of an assistant device group and/or dynamically adapting the assistant processing role(s) of the assistant device(s) of the assistant device group. In some of those implementations, the corresponding on-device model(s) and/or corresponding processing role(s), for each of the assistant devices of the group, is determined based on collectively considering individual processing capabilities of the assistant devices of the group. Implementations are additionally or alternatively directed to cooperatively utilizing assistant devices of a group, and their associated post-adaptation on-device model(s) and/or post-adaptation processing role(s), in cooperatively processing assistant requests that are directed to any one of the assistant devices of the group.

19 Claims, 9 Drawing Sheets

(56) References Cited

U.S. PATENT DOCUMENTS

| | | | |
|---|---|---|---|
| 2007/0033003 A1* | 2/2007 | Morris | G10L 15/08 704/9 |
| 2012/0023212 A1* | 1/2012 | Roth | H04W 8/005 709/223 |
| 2014/0370879 A1* | 12/2014 | Redding | H04M 3/42178 455/419 |
| 2015/0058018 A1* | 2/2015 | Georges | G10L 15/08 704/257 |
| 2015/0215350 A1* | 7/2015 | Slayton | G06F 9/453 709/204 |
| 2015/0371664 A1* | 12/2015 | Bar-or | G06F 9/54 704/270.1 |
| 2016/0080888 A1* | 3/2016 | Kreitzer | H04B 7/26 455/39 |
| 2016/0155443 A1* | 6/2016 | Khan | G10L 15/22 704/275 |
| 2016/0217785 A1* | 7/2016 | Kennewick | G10L 15/24 |
| 2016/0378455 A1* | 12/2016 | Lochan | H04L 67/34 717/169 |
| 2017/0357534 A1* | 12/2017 | Gupta | G06F 9/5027 |
| 2018/0108343 A1* | 4/2018 | Stevans | G10L 13/00 |
| 2018/0146042 A1* | 5/2018 | Choi | H04L 67/12 |
| 2018/0182397 A1* | 6/2018 | Carbune | G10L 15/30 |
| 2018/0204569 A1* | 7/2018 | Nadkar | G10L 15/22 |
| 2018/0286391 A1* | 10/2018 | Carey | G10L 15/22 |
| 2018/0332118 A1* | 11/2018 | Phipps | G10L 15/22 |
| 2018/0342244 A1 | 11/2018 | Thomsen | |
| 2019/0279615 A1* | 9/2019 | Ben-Dor | G10L 13/00 |
| 2019/0355365 A1* | 11/2019 | Kim | G06F 3/167 |
| 2020/0133629 A1* | 4/2020 | Pratt | G06F 3/017 |
| 2020/0135200 A1* | 4/2020 | Taparia | G10L 15/08 704/257 |
| 2021/0183397 A1* | 6/2021 | Liu | G06F 3/017 |
| 2021/0243200 A1* | 8/2021 | Carbune | H04W 12/082 |
| 2022/0130396 A1* | 4/2022 | Kim | G10L 17/02 |

* cited by examiner

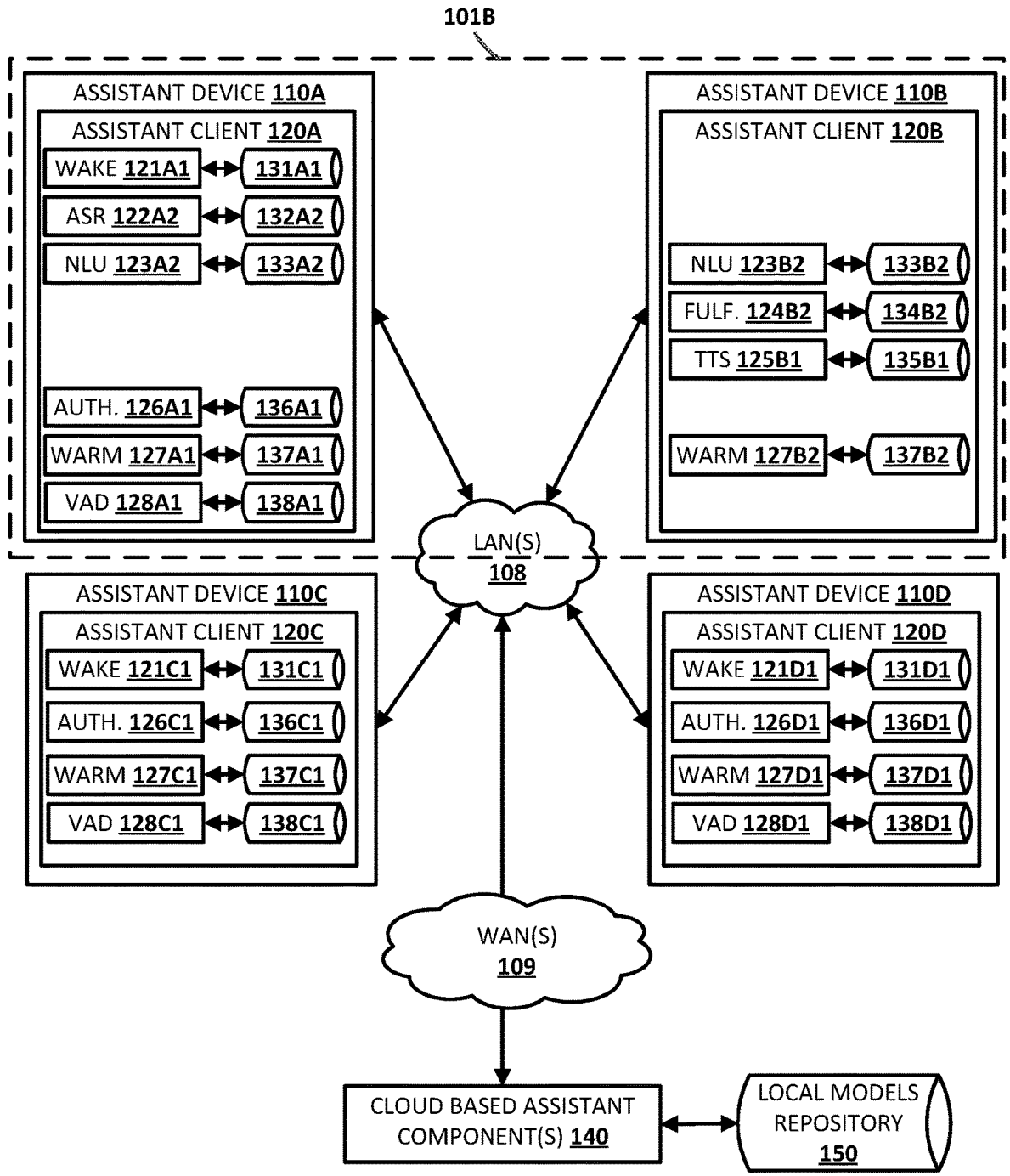
FIG. 1B1

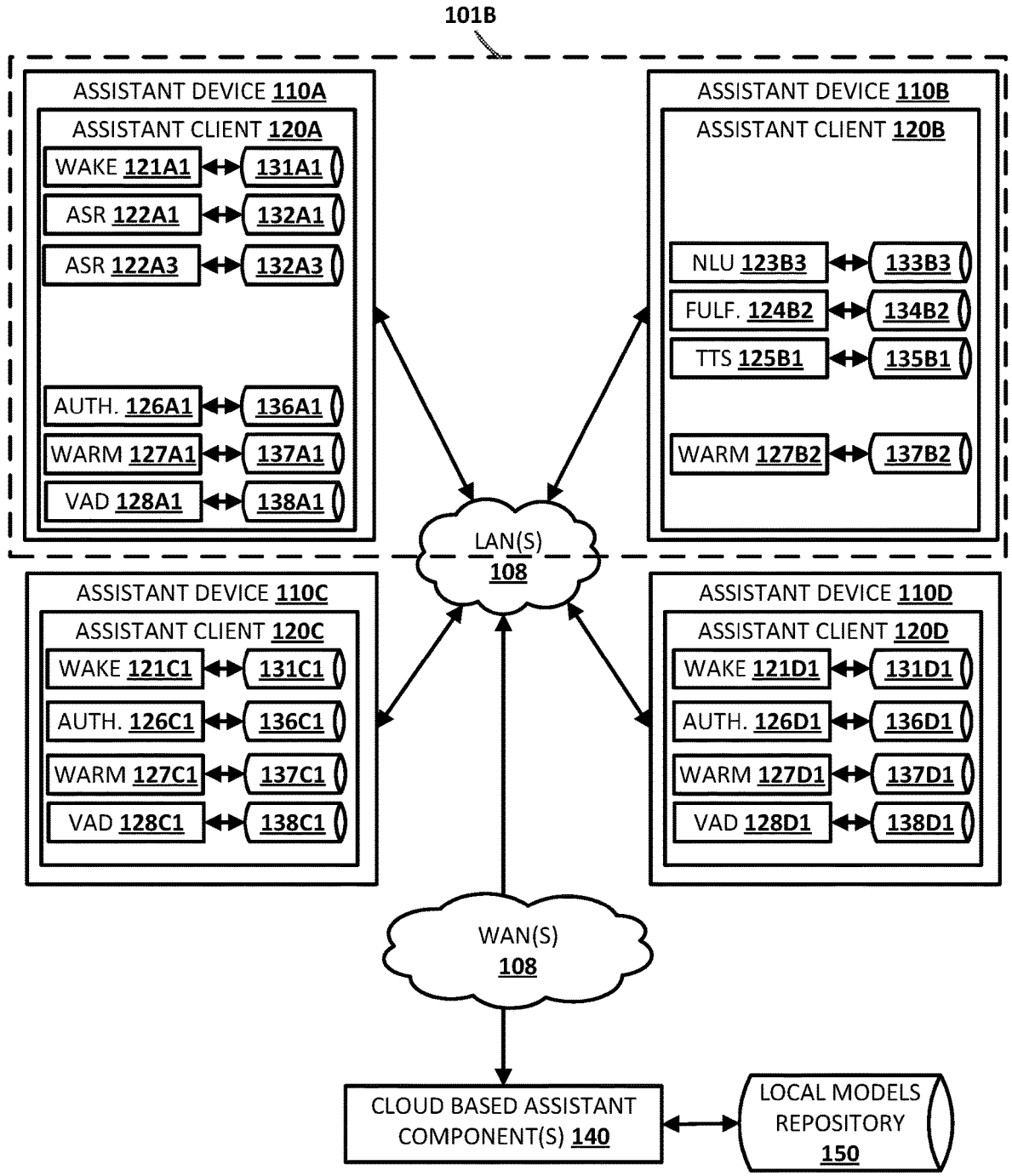
FIG. 1B2

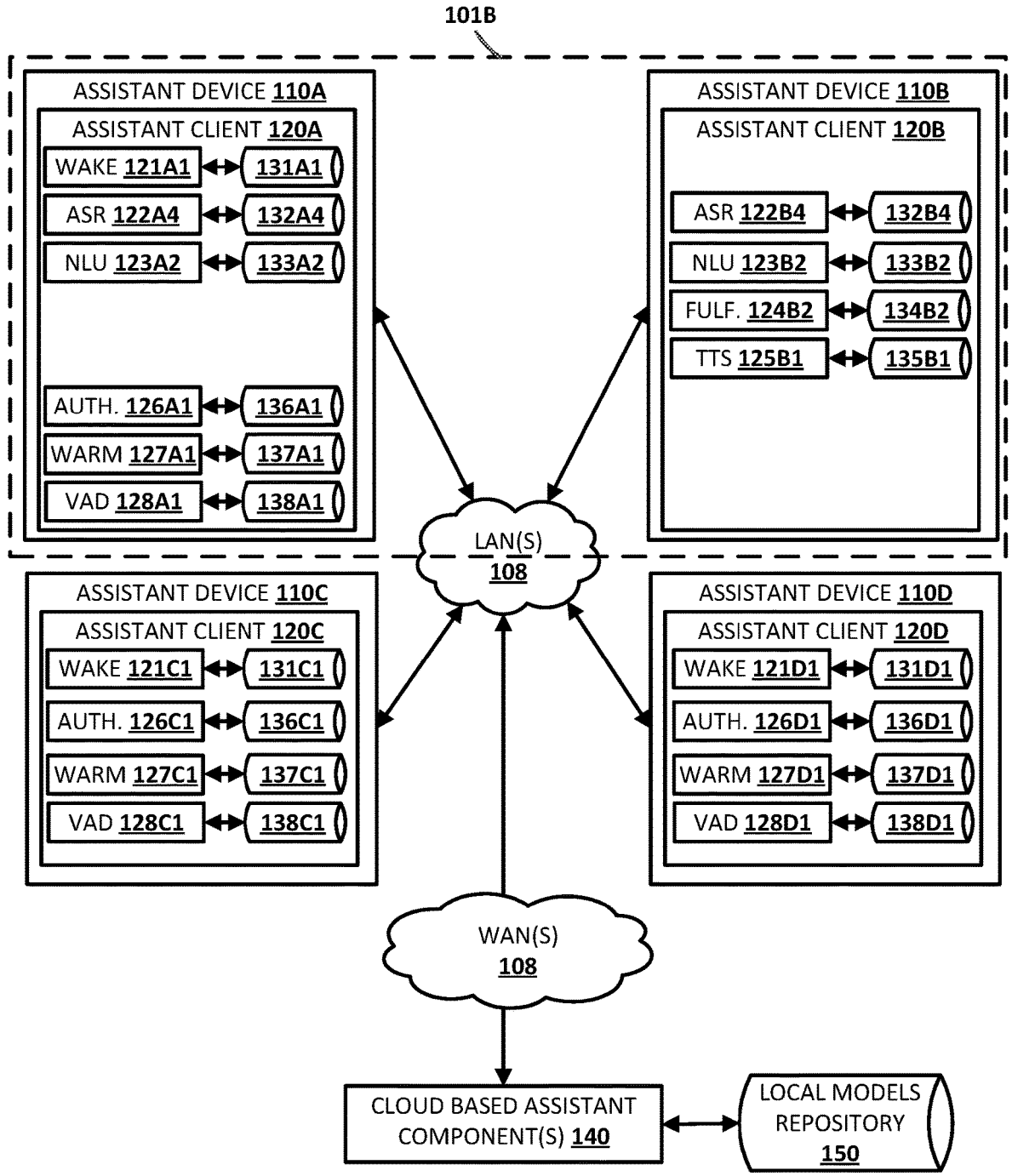
FIG. 1B3

DYNAMICALLY ADAPTING ON-DEVICE MODELS, OF GROUPED ASSISTANT DEVICES, FOR COOPERATIVE PROCESSING OF ASSISTANT REQUESTS

BACKGROUND

Humans can engage in human-to-computer dialogs with interactive software applications referred to herein as "automated assistants" (also referred to as "chatbots," "interactive personal assistants," "intelligent personal assistants," "personal voice assistants," "conversational agents," etc.). For example, humans (which when they interact with automated assistants may be referred to as "users") can provide commands and/or requests to an automated assistant using spoken natural language input (i.e., spoken utterances), which can in some cases be converted into text and then processed. Command(s) and/or request(s) can additionally or alternatively be provided via other input modality or modalities, such as textual (e.g., typed) natural language input, touch-screen input, and/or touch-free gesture input (e.g., detected by camera(s) of a corresponding assistant device). An automated assistant generally responds to a command or request by providing responsive user interface output (e.g., audible and/or visual user interface output), controlling smart device(s), and/or performing other action(s).

Automated assistants typically rely upon a pipeline of components in processing user requests. For example, a wake word detecting engine can be used to process audio data in monitoring for occurrence of a spoken wake word (e.g., "OK Assistant") and, in response to detecting the occurrence, cause processing by other component(s) to take place. As another example, an automatic speech recognition (ASR) engine can be used to process audio data that includes a spoken utterance, to generate a transcription (i.e., sequence of term(s) and/or other token(s)) of the user's utterance. The ASR engine can process audio data based on its following occurrence of a spoken wake word, as detected by the wake word detection engine, and/or in response to other invocation(s) of the automated assistant. As another example, a natural language understanding (NLU) engine can be used to process text of a request (e.g., text converted from a spoken utterance using ASR) to generate a symbolic representation, or belief state, that is a semantic representation of the text. For instance, the belief state could include intent(s) that correspond to the text and optionally parameter(s) (e.g., slot values) for the intent(s). The belief state, once fully formed (e.g., all mandatory parameters resolved) through one or more dialog turns, represents action(s) to be performed responsive to the spoken utterance. A separate fulfillment component can then utilize the fully formed belief state to perform the action(s) that corresponds to the belief state.

A user utilizes one or more assistant devices (a client device having an automated assistant interface) in interacting with an automated assistant. The pipeline of components utilized in processing a request that is provided at an assistant device can include component(s) that are executed locally at the assistant device and/or component(s) that are implemented at one or more remote servers that are in network communication with the assistant device.

Efforts have been made to increase a quantity of the components that are executed locally at the assistant device and/or to increase robustness and/or accuracy of such components. Those efforts are motivated by consideration(s) such as decreasing latency, increasing security of data, decreasing network usage, and/or seeking to achieve other technical benefit(s). As one example, some assistant devices can include a local wake word engine and/or a local ASR engine.

However, due to limited processing capabilities of various assistant devices, component(s) that are implemented locally at the assistant device can be less robust and/or accurate than cloud-based counterparts. This can be especially true for older and/or less costly assistant devices, which can lack: (a) the processing power and/or memory capacity to execute various component(s) and/or utilize their associated model(s); (b) and/or the disk-space capacity to store various associated model(s).

SUMMARY

Implementations disclosed herein are directed to dynamically adapting which assistant on-device model(s) are locally stored at assistant devices of an assistant device group and/or adapting the assistant processing role(s) of the assistant device(s) of the assistant device group. In some of those implementations, the corresponding on-device model(s) and/or corresponding processing role(s), for each of the assistant devices of the group, is determined based on collectively considering individual processing capabilities of the assistant devices of the group. For example, the on-device model(s) and/or processing role(s) for a given assistant device can be determined based on the individual processing capabilities of the given assistant device (e.g., can the given assistant device store those on-device model(s) and perform those processing role(s) in view of processor, memory, and/or storage constraints) and in view of corresponding processing capabilities of the other assistant device(s) of the group (e.g., will other device(s) be able to store other necessary on-device model(s) and/or perform other necessary processing role(s)). In some implementations, usage data can also be utilized in determining the corresponding on-device model(s) and/or corresponding processing role(s), for each of the assistant devices of the group.

Implementations disclosed herein are additionally or alternatively directed to cooperatively utilizing assistant devices of a group, and their associated post-adaptation on-device model(s) and/or post-adaptation processing role(s), in cooperatively processing assistant requests that are directed to any one of the assistant devices of the group.

In these and other manners, on-device models and on-device processing roles can be distributed among multiple disparate assistant devices of a group in view of processing capabilities of those assistant devices. Further, the collective robustness and/or capabilities of the on-device models and on-device processing roles, when distributed among multiple assistant devices of the group, surpasses that which is possible with any one of the assistant devices individually. Put another way, implementations disclosed herein can effectively implement an on-device pipeline of assistant components that is distributed among assistant devices of a group. The robustness and/or accuracy of such a distributed pipeline well surpasses the robustness and/or accuracy capabilities of any pipeline that was instead implemented on only a single of the assistant devices of the group. Increasing the robustness and/or accuracy as disclosed herein can reduce latency for a larger quantity of assistant requests. Further, the increased robustness and/or accuracy results in less (or even no) data being transmitted to remote automated assistant component(s) in resolving assistant requests. This directly results in improved security of user data, a decrease in frequency of network usage, a decrease in the quantity of data transmitted over the network, and/or decreased latency in resolving assistant requests (e.g., those assistant request(s) resolved locally can be resolved with less latency than if remote assistant component(s) were involved).

Certain adaptations can result in one or more assistant devices of the group lacking engine(s) and/or model(s) necessary for that assistant device to process many assistant requests on its own. For example, certain adaptations can result in an assistant device lacking any wake word detection capabilities and/or ASR capabilities. However, when in a group and adapted according to implementations disclosed herein, the assistant device can cooperatively process assistant requests in cooperation with other assistant device(s) of the group—with each performing its own processing role(s) and utilizing its own on-device model(s) in doing so. Accordingly, assistant requests directed to the assistant device can still be processed in cooperation with other assistant devices of the group.

In various implementations, the adaptations to the assistant device(s) of the group are performed in response to generation of the group or modification of the group (e.g., incorporation or removal of assistant device(s) from the group). As described herein, a group can be generated based on explicit user input(s) that indicate a desire for the group and/or automatically based on, for example, determining the assistant device(s) of the group satisfy proximity condition(s) relative to one another. In implementations that perform the adaptation(s) only when group(s) are created in such manner(s), occurrences of two assistant requests received simultaneously at two separate devices of the group (and that may not be able to be processed cooperatively in parallel) can be mitigated. For example, when proximity condition(s) are taken into account in generating a group, it is unlikely that two disparate simultaneous requests will be received at two different assistant devices of the group. For instance, such occurrences are less likely when the assistant devices of the group are all in the same room as opposed to the assistant devices of the group being scattered across multiple floors of a house. As another example, when user input explicitly indicates a group should be generated, it is likely that non-overlapping assistant requests would be provided to the assistant device(s) of the group.

As one particular example of various implementations, assume an assistant device group is generated that consists of a first assistant device and a second assistant device. Further assume that, at a time of the assistant device group being generated, the first assistant device includes a wake word engine and corresponding wake word model(s), a warm cue(s) engine and corresponding warm cue(s) model(s), an authentication engine and corresponding authentication model(s), and a corresponding on-device ASR engine and corresponding ASR model. Further assume that, at the time of the assistant device group being generated, the second assistant device also includes the same engines and models as the first assistant device (or variants thereof) and additionally includes: an on-device NLU engine and corresponding NLU model(s), an on-device fulfillment and corresponding fulfillment model(s), and an on-device TTS engine and corresponding TTS model(s).

In response to the first assistant device and the second assistant device being grouped, the assistant on-device model(s) that are locally stored at the first assistant device and the second assistant device and/or corresponding processing roles of the first and second assistant devices can be adapted. The on-device model(s) and processing role(s), for each of the first and second assistant devices, can be determined based on considering first processing capabilities of the first assistant device and of the second assistant device. For example, a set of on-device models can be determined that includes a first subset that is capable of being stored and utilized, by a corresponding processing role/engine, on the first assistant device. Further, the set can include a second subset that is capable of being stored and utilized, by a corresponding processing role, on the second assistant device. For example, the first subset can include only ASR model(s), but the ASR model(s) of the first subset can be more robust and/or accurate than the pre-adaptation ASR model(s) of the first assistant device. Further, they can require greater computational resources to utilize in performing ASR. However, the first assistant device can have only the ASR model(s) and ASR engine of the first subset, and the pre-adaptation models and engines can be purged, thereby freeing up computational resources for utilization in performing ASR utilizing the ASR model(s) of the first subset. Continuing with the example, the second subset can include the same model(s) as the second assistant device included before, except the ASR model(s) can be omitted and a more robust and/or more accurate NLU model(s) can replace the pre-adaptation NLU model(s). The more robust and/or more accurate NLU model(s) can require greater resources than the pre-adaptation NLU model(s), but those can be freed through purging of the pre-adaptation ASR model(s) (and the omission of any ASR model(s) from the second subset).

The first assistant device and the second assistant device can then cooperatively utilize their associated post-adaptation on-device model(s) and/or post-adaptation processing role(s), in cooperatively processing assistant requests that are directed to either of the assistant devices of the group. For example, assume a spoken utterance of "OK Assistant, increase the temperature two degrees". The wake cue(s) engine of the second assistant device can detect an occurrence of the wake cue "OK Assistant". In response, the wake cue(s) engine can transmit a command to the first assistant device to cause the ASR engine of the first assistant device to perform speech recognition on captured audio data that follows the wake cue. The transcription generated by the ASR engine of the first assistant device can be transmitted to the second assistant device, and the NLU engine of the second assistant device can perform NLU on the transcription. The results of the NLU can be communicated to the fulfillment engine of the second assistant device, which can use those NLU results to determine command(s) to transmit to a smart thermostat to cause it to increase the temperature by two degrees.

The preceding is provided as an overview of only some implementations. Those and other implementations are disclosed in more detail herein.

In addition, some implementations may include a system including one or more user devices, each with one or more processors and memory operably coupled with the one or more processors, where the memory(ies) of the one or more user devices store instructions that, in response to execution of the instructions by the one or more processors of the one or more user devices, cause the one or more processors to perform any of the methods described herein. Some implementations also include at least one non-transitory computer-readable medium including instructions that, in response to execution of the instructions by one or more processors, cause the one or more processors to perform any of the methods described herein.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

BRIEF DESCRIPTION OF THE DRAWINGS

FIGS. 1B1, 1B2, and 1B3 each illustrate the example assistant ecosystem of FIG. 1A, with a first assistant device and a second assistant device having been grouped, and with a different example of adaptations that can be implemented.

FIG. 2 is a flowchart illustrating an example method of adapting on-device model(s) and/or processing role(s) of assistant devices in a group.

FIG. 3 is a flowchart illustrating an example method that can be implemented by each of multiple assistant devices in a group, in adapting on-device model(s) and/or processing role(s) of assistant devices in the group.

DETAILED DESCRIPTION

Many users may engage an automated assistant using any one of multiple assistant devices. For example, some users may possess a coordinated "ecosystem" of assistant devices that can receive user input directed to the automated assistant and/or can be controlled by the automated assistant, such as one or more smart phones, one or more tablet computers, one or more vehicle computing systems, one or more wearable computing devices, one or more smart televisions, one or more interactive standalone speakers, one or more interactive standalone speakers with a display, one or more IoT devices, among other assistant devices.

A user can engage in human-to-computer dialog with an automated assistant using any of these assistant devices (assuming an automated assistant client is installed and the assistant device is capable of receiving input). In some cases these assistant devices may be scattered around the user's primary residence, secondary residence, workplace, and/or other structure. For example, mobile assistant devices such as smart phones, tablets, smart watches, etc., may be on the user's person and/or wherever the user last placed them. Other assistant devices, such as traditional desktop computers, smart televisions, interactive standalone speakers, and IoT devices may be more stationary but nonetheless may be located at various places (e.g., rooms) within the user's home or workplace.

Figure 1A:
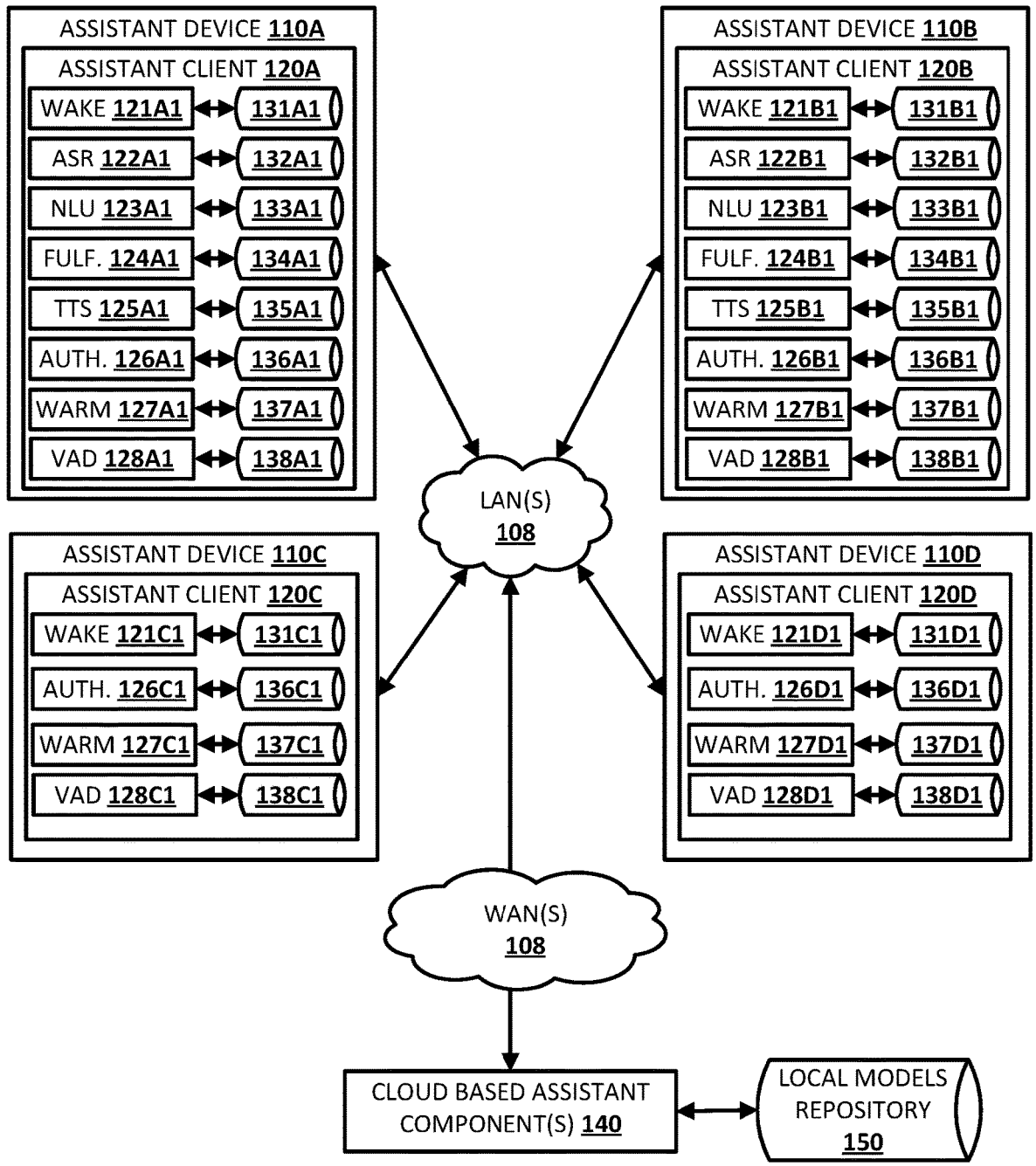
FIG. 1A is a block diagram of an example assistant ecosystem in which no assistant devices have been grouped and adapted according to implementations disclosed herein.

Turning initially to FIG. 1A, an example assistant ecosystem is illustrated. The example assistant ecosystem includes first assistant device 110A, second assistant device 110B, third assistant device 110C, and fourth assistant device 110D. The assistant devices 110A-D can all be disposed within a household, a business, or other environment. Further, the assistant devices 110A-D can all be linked together, or otherwise associated with one another, in one or more data structures. For example, the four assistant devices 110A-D can all be registered with the same user account, registered with the same set of user account(s), registered with a particular structure, and/or all assigned to a particular structure in a device topology representation. The device topology representation can include, for each of the assistant devices 110A-D, corresponding unique identifier(s) and can optionally include corresponding unique identifier(s) for other device(s) that are not assistant devices (but can be interacted with via an assistant device), such as IoT device(s) that do not include an assistant interface. Further, the device topology representation can specify device attribute(s) associated with the respective assistant devices 110A-D. The device attributes for a given assistant device can indicate, for example, one or more input and/or output modalities supported by the respective assistant devices, processing capabilities for the respective assistant devices, a make, model, and/or unique identifier (e.g., serial number) of the respective assistant devices (based on which processing capabilities can be determined), and/or other attribute(s). As another example, the four assistant devices can all be linked together, or otherwise associated with one another, as a function of being connected to the same wireless network, such as a secure access wireless network and/or as a function of collectively being in peer-to-peer communication with one another (e.g., via Bluetooth and after pairing(s)). Put another way, in some implementations multiple assistant devices can be considered linked together, and potentially adapted according to implementations disclosed herein, as a function of being in secure network connection with one another and without necessarily being associated with one another in any data structure.

As a non-limiting working example, the first assistant device 110A can be a first type of assistant device, such as a particular model of an interactive standalone speaker with a display and a camera. The second assistant device 110B can be a second type of assistant device, such as a first model of an interactive standalone speaker without a display or camera. Assistant devices 110C and 110D can each be a third type of assistant device, such as a third model of an interactive standalone speaker without a display. The third type (assistant devices 110C and 110D) can have less processing capabilities than the second type (assistant device 110D). For example, the third type can have processor(s) with less processing capabilities than processor(s) of the second type. For instance, the processor(s) of the third type can lack any GPU whereas the processor(s) of the first type include GPU(s). Also, for instance, the processor(s) of the third type can have a smaller cache and/or a lower operating frequency than the processors(s) of the second type. As another example, the size of the on-device memory of the third type can be less than the size of the on-device memory of the second type (e.g., 1 GB as compared to 2 GB). As yet another example, the available disk space of the third type can be less than the available disk space of the first type. The available disk space can be different from the currently available disk space. For example, the available disk space can be determined as the currently available disk space plus disk space currently occupied by one or more on-device model(s). As another example, the available disk space can be the total disk space, subtracting away any space occupied by an operating system and/or other particular software. Continuing with the working example, the first type and the second type can have the same processing capabilities.

In addition to being linked together in data structure(s), two or more (e.g., all) of the assistant devices 110A-D are also at least selectively in communication with one another via local area network(s) (LAN(s)) 108. LAN(s) 108 can include wireless network(s) such as those utilizing Wi-Fi, direct peer-to-peer network(s) such as those utilizing Bluetooth, and/or other communication topologies utilizing other communication protocol(s).

The assistant device 110A includes an assistant client 120A, which can be a standalone application on top of an operating system or can form all or part of the operating system of the assistant device 110A. The assistant client 120A, in FIG. 1A, includes a wake/invocation engine 121A1 and one or more associated on-device wake/invocation models 131A1. The wake/invocation engine 121A1 can monitor for occurrence of one or more wake or invocation cues and, responsive to detecting one or more of the cue(s), can invoke one or more previously inactive functions of the assistant client 120A. For example, invoking the assistant client 120A can include causing ASR engine 122A1, NLU engine 123A1, and/or other engine(s) to be activated. For instance, it can cause ASR engine 122A1 to process further audio data frames that follow the wake or invocation cues (whereas prior to invoking no further processing of audio data frames was occurring) and/or can cause the assistant client 120A to transmit the further audio data frames and/or other data to be transmitted to cloud based assistant component(s) 140 for processing (e.g., processing of audio data frames by a remote ASR engine of cloud based assistant component(s) 140).

In some implementations, the wake cue(s) engine 121A can continuously process (e.g., if not in an "inactive" mode) a stream of audio data frames that are based on output from one or more microphones of the client device 110A, to monitor for an occurrence of a spoken wake word(s) or invocation phrase(s) (e.g., "OK Assistant", "Hey Assistant"). The processing can be performed by the wake cue(s) engine 121A utilizing one or more of the wake model(s) 131A1. For example, one of the wake model(s) 131A1 can be a neural network model trained to process frames of audio data and generate output that indicates whether one or more wake words are present in the audio data. While monitoring for the occurrence of the wake word(s), the wake cue(s) engine 121 discards (e.g., after temporary storage in a buffer) any audio data frames that do not include the wake word(s). The wake cue(s) engine 121A1 can, in addition to or instead of monitoring for occurrence of wake word(s), monitor for occurrence of other invocation cue(s). For example, the wake cue(s) engine 121A1 can also monitor for a press of an invocation hardware button and/or of an invocation software button. As another example, and continuing with the working example, when the assistant device 110A include a camera, the wake cue(s) engine 121A1 can also optionally process image frame(s) from the camera in monitoring for occurrence of an invocation gesture(s) such as a hand wave while a user's gaze is directed at the camera and/or other invocation cue(s) such as a user's gaze being directed at the camera along with an indication that the user is speaking.

The assistant client 120A, in FIG. 1A, also includes an automatic speech recognition (ASR) engine 122A1 and one or more associated on-device ASR models 132A1. The ASR engine 122A1 can be used to process audio data that includes a spoken utterance, to generate a transcription (i.e., sequence of term(s) and/or other token(s)) of the user's utterance. The ASR engine 122A1 can process audio data utilizing the on-device ASR model(s) 132A1. The on-device ASR model(s) 132A1 can include, for example, a two-pass ASR model that is a neural network model and that is utilized by the ASR engine 122A1 to generate a sequence of probabilities over tokens (and the probabilities utilized to generate the transcript). As another example, the on-device ASR model(s) 132A1 can include an acoustic model that is a neural network model, and a language model that includes a mapping of phoneme sequences to words. The ASR engine 122A1 can process audio data using the acoustic model, to generate a sequence of phonemes, and map the sequence of phonemes to particular terms using the language model. Additional or alternative ASR models can be utilized.

The assistant client 120A, in FIG. 1A, also includes a natural language understanding (NLU) engine 123A1 and one or more associated on-device NLU models 133A1. The NLU engine 123A1 can generate a symbolic representation, or belief state, that is a semantic representation of natural language text, such as text in a transcription generated by ASR engine 122A1 or typed text (e.g., typed utilizing a virtual keyboard of assistant device 110A). For instance, the belief state could include intent(s) that correspond to the text and optionally parameter(s) (e.g., slot values) for the intent(s). The belief state, once fully formed (e.g., all mandatory parameters resolved) through one or more dialog turns, represents action(s) to be performed responsive to the spoken utterance. In generating the symbolic representation, the NLU engine 123A1 can utilize one or more on-device NLU models 133A1. The NLU model(s) 133A1 can include one or more neural network models that are trained to process text and generate output that indicates intent(s) expressed by the text and/or an indication of which portion(s) of text correspond to which parameter(s) for the intent. The NLU model(s) can additionally or alternatively include one or more models that include mappings of text and/or templates, to corresponding symbolic representation(s). For example, the mappings can include a mapping of the text "what time is it" to an intent of "current time" with parameters of "current location". As another example, the mappings can include a mapping of the template "add [item(s)] to my shopping list" to an intent of "insert in shopping list" with parameter(s) of the item(s) that are included in the actual natural language that corresponds to the [item(s)] in the template.

The assistant client 120A, in FIG. 1A, also includes a fulfillment engine 124A1 and one or more associated on-device fulfillment models 134A1. The fulfillment engine 124A1 can utilize a fully formed symbolic representation, from the NLU engine 123A1, to perform, or cause performance of, the action(s) that corresponds to the symbolic representation. The action(s) can include providing responsive user interface output (e.g., audible and/or visual user interface output), controlling smart device(s), and/or performing other action(s). In performing or causing performance of the action(s), the fulfillment engine 124A1 can utilize fulfillment model(s) 134A1. As one example, for an intent of "turn on" with parameter(s) that specify particular smart light(s), the fulfillment engine 124A1 can utilize the fulfillment model(s) 134A1 to identify network address(es) of the particular smart light(s) and/or command(s) to transmit to cause the particular smart light(s) to transition to an "on" state. As another example, for an intent of "current" with a parameter of "current location", the fulfillment engine 124A1 can utilize the fulfillment model(s) 134A1 to identify that a current time at the client device 110A should be retrieved and audibly rendered (utilizing the US engine 125A1).

The assistant client 120A, in FIG. 1A, also includes a text-to-speech (US) engine 125A1 and one or more associated on-device TTS models 135A1. The US engine 125A1 can process text (or a phonetic representation thereof) utilizing the on-device US model(s) 135A1 to generate synthesized speech. The synthesized speech can be audibly rendered via speaker(s) of the assistant device 110A local text-to-speech ("TTS") engine (that converts text to speech). Synthesized speech can be generated and rendered as all or part of a response from the automated assistant and/or in prompting the user to define and/or clarify parameter(s) and/or intent(s) (e.g., as orchestrated by NLU engine 123A1 and/or a separate dialog state engine).

The assistant client 120A, in FIG. 1A, also includes an authentication engine 126A1 and one or more associated on-device authentication models 136A1. The authentication engine 126A1 can utilize on or more authentication technique(s) to verify which of multiple registered user is interacting with the assistant device 110 or, if only a single user is registered for the assistant device 110, whether it is the registered user interacting with the assistant device 110 (or instead a guest/unregistered user). As one example, text-dependent speaker verification(s) (TD-SV(s)) can be generated and stored for each of the registered users (e.g., in association with their corresponding user profiles), with permission from the associated user(s). The authentication engine 126A1 can utilize a TD-SV model, of the on-device authentication model(s) 136A1 in generating a corresponding TD-SV and/or in processing a corresponding portion of audio data TD-SV to generate a corresponding current TD-SV that can then be compared to the stored TD-SV(s) to determine whether there is a match. As other examples, the authentication engine 126A1 can additionally or alternatively utilize text-independent speaker verification (TI-SV) techniques, speaker verification techniques, facial verification techniques, and/or other verification technique(s) (e.g., PIN entry)—and corresponding on-device authentication model(s) 136A1 in authenticating a particular user.

The assistant client 120A, in FIG. 1A, also includes a warm cue(s) engine 127A1 and one or more associated on-device warm cue(s) models 137A1. The warm cue(s) engine 127A1 can at least selectively monitor for occurrence of one or more warm word(s) or other warm cue(s) and, responsive to detecting one or more of the warm cue(s), cause a particular action to be performed by the assistant client 120A. The warm cue(s) can be in addition to any wake word(s) or other wake cue(s) and each of the warm cue(s) can be at least selectively active. Notably, detecting the occurrence of a warm cue causes a particular action to be performed even when the detected occurrence is not preceded by any wake cue. Accordingly, when a warm cue is a particular word or words, a user can simply speak the word(s), without needing to provide any wake cue(s), and cause performance of a corresponding particular action.

As one example, "stop" warm cue(s) can be active at least at times when a timer or alarm is being audibly rendered at assistant device 110A via automated assistant 120A. For instance, at such times the warm cue(s) engine 127A can continuously (or at least when VAD engine 128A1 detects voice activity) process a stream of audio data frames that are based on output from one or more microphones of the client device 110A, to monitor for an occurrence of "stop", "halt", or other limited set of particular warm word(s). The processing can be performed by the warm cue(s) engine 127A utilizing, one of the warm cue(s) model(s) 137A1, such as a neural network model trained to process frames of audio data and generate output that indicates whether a spoken occurrence of "stop" is present in the audio data. In response to detecting occurrence of "stop", the warm cue(s) engine 127A can cause a command to be implemented that clears the audibly sounding timer or alarm. At such times the warm cue(s) engine 127A can continuously (or at least when a presence sensor detects presence) process a stream of images, form a camera of the assistant device 110A, to monitor for occurrence of a hand in a "stop" pose. The processing can be performed by the warm cue(s) engine 127A utilizing, one of the warm cue(s) model(s) 137A1, such as a neural network model trained to process frames of vision data and generate output that indicates whether hand is present an in a "stop" pose. In response to detecting occurrence of the "stop" pose, the warm cue(s) engine 127A can cause a command to be implemented that clears the audibly sounding timer or alarm.

As another example, "volume up", "volume down", and "next" warm cue(s) can be active at least at times when music is being audibly rendered at assistant device 110A via automated assistant 120A. For instance, at such times the warm cue(s) engine 127A can continuously process a stream of audio data frames that are based on output from one or more microphones of the client device 110A. The processing can includes using a first of the warm cue(s) model(s) 137A1 to monitor for an occurrence of "volume up", using a second of the warm cue(s) model(s) 137A1 to monitor for occurrence of "volume down", and using a third of the warm cue(s) model(s) 137A1 to monitor for occurrence of "next". In response to detecting occurrence of "volume up", the warm cue(s) engine 127A can cause a command to be implemented that increases the volume of the music being rendered, in response to detecting occurrence of "volume down", the warm cue(s) engine can cause a command to be implemented that decreases the volume of the music, and in response to detecting occurrence of "volume down", the warm cue(s) engine can cause a command to be implemented that causes a next track to be rendered instead of the current music track.

The assistant client 120A, in FIG. 1A, also includes a voice activity detector (VAD) engine 128A1 and one or more associated on-device VAD models 138A1. The VAD engine 128A1 can at least selectively monitor for occurrence of voice activity in audio data and, responsive to detecting an occurrence, cause one or more functions to be performed by the assistant client 120A. For example, the VAD engine 128A1, responsive to detecting voice activity, can cause the wake cue(s) engine 121A1 to be activated. As another example, the VAD engine 128A1 can be utilized in a continued listening mode to monitor for occurrence of voice activity in audio data and, responsive to detecting an occurrence, cause the ASR engine 122A1 to be activated. The VAD engine 128A1 can process audio data utilizing VAD model(s) 138A1 in determining whether voice activity is present in the audio data.

Particular engines and corresponding models have been described with respect to assistant client 120A. However, it is noted that some engines can be omitted and/or additional engine(s) can be included. It is also noted that assistant client 120A, through its various on-device engines and corresponding models, can fully process many assistant requests, including many assistant requests that are provided as spoken utterances. However, because the client device 110A is relatively constrained in terms of processing capabilities, there are still many assistant requests that cannot be fully processed locally at the assistant device 110A. For example, the NLU engine 123A1 and/or corresponding NLU models 133A1 may only cover a subset of all available intents and/or parameters available via the automated assistant. As another example, the fulfillment engine 124A1 and/or corresponding fulfillment model(s) may only cover a subset of available fulfillments. As yet another example, the ASR engine 122A1 and corresponding ASR model(s) 132A1 may not be robust and/or accurate enough to correctly transcribe various spoken utterances.

In view of these and other considerations, cloud based assistant component(s) 140 can still be at least selectively utilized in performing at least some processing of assistant requests received at the assistant device 110A. Cloud based automated assistant components 140 can include counterpart engines and/or models to those of the assistant device 110A (and/or additional or alternatives). However, since cloud based automated assistant components 140 can leverage the virtually limitless resources of the cloud, one or more the cloud based counterparts can be more robust and/or accurate than those of the assistant client 120A. As one example, in response to a spoken utterance that seeks performance of assistant action(s) not supported by the local NLU engine 123A1 and/or the local fulfillment engine 124A1, the assistant client 120A can transmit audio data for the spoken utterance, and/or a transcription thereof generated by ASR engine 122A1, to the cloud based automated assistant components 140. The cloud based automated assistant components 140 (e.g., an NLU engine and/or fulfillment engine thereof) can perform more robust processing of such data, enabling resolution and/or performance of the assistant action(s). The transmitting of data to the cloud based automated assistant components 140 is via one or more wide area networks (WAN(s)) 109, such as the Internet or a private WAN.

The second assistant device 110B includes an assistant client 120B, which can be a standalone application on top of an operating system or can form all or part of the operating system of the assistant device 110B. Like assistant client 120A, the assistant client 120B includes: a wake/invocation engine 121B1 and one or more associated on-device wake/invocation models 131B1; an ASR engine 122B1 and one or more associated on-device ASR models 132B1; an NLU engine 123B1 and one or more associated on-device NLU models 133B1; a fulfillment engine 124B1 and one or more associated on-device fulfillment models 134B1; a TTS engine 125B1 and one or more associated on-device TTS models 135B1; an authentication engine 126B1 and one or more associated on-device authentication models 136B1; a warm cue(s) engine 127B1 and one or more associated on-device warm cue(s) models 137B1; and a VAD engine 128B1 and one or more associated on-device VAD models 138B1.

Some or all of the engines and/or the models of assistant client 120B can be the same as those of assistant client 120A and/or some or all of the engines and/or the models can differ. For example, the wake cue(s) engine 121B1 may lack the functionality to detect wake cue(s) in image(s) and/or the wake model(s) 131B1 may lack model(s) for processing image(s) for detection of wake cue(s)—while wake cue(s) engine 121A1 includes such functionality and wake model(s) 131B1 include such model(s). This can be due to, for example, assistant device 110A including a camera and assistant device 1106 not including a camera. As another example, the ASR model(s) 131B1 utilized by ASR engine 122B1 can differ from the ASR model(s) 131A1 utilized by ASR engine 122A1. This can be due to, for example, different models being optimized for differing processor and/or memory capabilities amongst the assistant device 110A and the assistant device 110B.

Particular engines and corresponding models have been described with respect to assistant client 120B. However, it is noted that some engines can be omitted and/or additional engine(s) can be included. It is also noted that assistant client 120B, through its various on-device engines and corresponding models, can fully process many assistant requests, including many assistant requests that are provided as spoken utterances. However, because the client device 110B is relatively constrained in terms of processing capabilities, there are still many assistant requests that cannot be fully processed locally at the assistant device 110B. In view of these and other considerations, cloud based assistant component(s) 140 can still be at least selectively utilized in performing at least some processing of assistant requests received at the assistant device 110B.

The third assistant device 110C includes an assistant client 120C, which can be a standalone application on top of an operating system or can form all or part of the operating system of the assistant device 110C. Like assistant client 120A and assistant client 120B, the assistant client 120C includes: a wake/invocation engine 121C1 and one or more associated on-device wake/invocation models 131C1; an authentication engine 126C1 and one or more associated on-device authentication models 136C1; a warm cue(s) engine 127C1 and one or more associated on-device warm cue(s) models 137C1; and a VAD engine 128C1 and one or more associated on-device VAD models 138C1. Some or all of the engines and/or the models of assistant client 120C can be the same as those of assistant client 120A and/or assistant client 1206 and/or some or all of the engines and/or the models can differ.

However, it is noted that unlike assistant client 120A and assistant client 120B, the assistant client 120C does not include: any ASR engine or associated models; any NLU engine or associated models; any fulfillment engine or associated models; and any TTS engine or associated models. Further, it is also noted that assistant client 120B, through its various on-device engines and corresponding models, can fully process only certain assistant request(s) (i.e., those that conform to warm cue(s) detected by warm cue(s) engine 127C1) and cannot process many assistant requests, such as those that are provided as spoken utterances and that do not conform to a warm cue. In view of these and other considerations, cloud based assistant component(s) 140 can still be at least selectively utilized in performing at least some processing of assistant requests received at the assistant device 110C.

The fourth assistant device 110D includes an assistant client 120D, which can be a standalone application on top of an operating system or can form all or part of the operating system of the assistant device 110D. Like assistant client 120A, assistant client 120B, and assistant client 120C, the assistant client 120D includes: a wake/invocation engine 121D1 and one or more associated on-device wake/invocation models 131D1; an authentication engine 126D1 and one or more associated on-device authentication models 136D1; a warm cue(s) engine 127D1 and one or more associated on-device warm cue(s) models 137D1; and a VAD engine 128D1 and one or more associated on-device VAD models 138D1. Some or all of the engines and/or the models of assistant client 120C can be the same as those of assistant client 120A, assistant client 1206, and/or assistant client 120C—and/or some or all of the engines and/or the models can differ.

However, it is noted that unlike assistant client 120A and assistant client 1206—and like assistant client 120C, the assistant client 120D does not include: any ASR engine or associated models; any NLU engine or associated models; any fulfillment engine or associated models; and any TTS engine or associated models. Further, it is also noted that assistant client 120D, through its various on-device engines and corresponding models, can fully process only certain assistant request(s) (i.e., those that conform to warm cue(s) detected by warm cue(s) engine 127D1) and cannot process many assistant requests, such as those that are provided as spoken utterances and that do not conform to a warm cue. In view of these and other considerations, cloud based assistant component(s) 140 can still be at least selectively utilized in performing at least some processing of assistant requests received at the assistant device 110D.

Turning now to FIGS. 1B1, 1B2, 1B3, 1C, and 1D, different non-limiting examples of assistant device groups are illustrated, along with different non-limiting examples of adaptations that can be implemented responsive to the assistant device groups being generated. Through each of the adaptations, the grouped assistant devices can be collectively utilized in processing various assistant requests and, through the collective utilization, can perform more robust and/or more accurate processing, of those various assistant requests, than any one of the assistant devices of the group could perform individually prior to the adaptations. This results in various technical advantages such as those described herein.

In FIGS. 1B1, 1B2, 1B3, 1C, and 1D, the engines and models, of the assistant clients, that have the same reference number as in FIG. 1A have not been adapted relative to FIG. 1A. For example, in FIGS. 1B1, 1B2, and 1B3, the engines and models of assistant client devices 110C and 110D have not been adapted, as assistant client devices 110C and 110D are not included in the group 101B of FIGS. 1B1, 1B2, and 1B3. However, in FIGS. 1B1, 1B2, 1B3, 1C, and 1D, the engines and models, of the assistant clients, that have a reference number that differs from that of FIG. 1A (i.e., ends in a "2", "3", or "4" instead of a "1") indicates that it has been adapted relative to its counterpart in FIG. 1. Further, an engine or model(s) having a reference number that ends in a "2" in one figure and that ends in a "3" in another figure means that different adaptations to the engine or model(s) have been made between the figures. Likewise, an engine or model(s) having a reference number that ends in a "4" in a figure means the adaptation to the engine or model(s) is different in that figure than it is in figures in which the reference number ends in a "2" or a "3".

Turning to FIG. 1B1 initially, a device group 101B has been made in which assistant devices 110A and 110B are included in the device group 101B. In some implementations, the device group 101B can be generated responsive to user interface input that explicitly indicates a desire to group the assistant devices 110A and 110B. As one example, the user can provide a spoken utterance of "group [label for assistant device 110A] and [label for assistant device 110B]" to any one of the assistant devices 110A-D. Such a spoken utterance can be processed, by the respective assistant device and/or the cloud based assistant components 140, interpreted as a request to group assistant devices 110A and 110B, and the group 101B generated in response to such an interpretation. As another example, a registered user for the assistant devices 110A-D can provide touch input(s) at an application that enables configuring settings of the assistant devices 110A-D. Those touch input(s) can explicitly designate that the assistant devices 110A and 110B are to be grouped, and the group 101B can be generated in response. As yet another example, one of the example techniques described below in automatically generating the device group 101B can instead be utilized to determine that the device group 101B should be generated, but user input explicitly approving generation of the device group 101B can be required before generating the device group 101B. For example, a prompt, that indicates the device group 101B should be generated, can be rendered at one or more of the assistant devices 110A-D, and the device group 101B only actually generated if affirmative user interface input is received in response to the prompt (and optionally if that user interface input is verified to come from a registered user).

In some implementations, the device group 101B can instead be generated automatically. In some of those implementations user interface output, that indicates the generation of the device group 101B, can be rendered at one or more of the assistant devices 110A-D to inform corresponding user(s) of the group and/or registered user(s) can override the automatic generation of the device group 101B through user interface input(s). However, when device group 101B is generated automatically, the device group 101B will be generated, and corresponding adaptations made, without first requiring user interface input that explicitly indicates a desire to create the particular device group 101B (although earlier in time input could indicate approval to create groups generally). In some implementations, the device group 101B can be generated automatically responsive to determining that the assistant devices 110A and 110B satisfy one or more proximity conditions relative to one another. For example, the proximity condition(s) can include that the assistant devices 110A and 110B are assigned, in a device topology, to a same structure (e.g., a particular home, a particular vacation home, a particular office) and/or to a same room (e.g., kitchen, living room, dining room) or other area(s) within the same structure. As another example, the proximity condition(s) can include that sensor signals, from each of the assistant devices 110A and 110B, indicate that they are positionally proximal to one another. For instance, if assistant device 110A and 110B both consistently (e.g., greater than 70% of the time or other threshold) detect occurrence of a wake word at or near (e.g., within a second of) the same time—this can indicate they are positionally proximate to one another. Also, for instance, one of the assistant devices 110A and 110B can emit a signal (e.g., an ultrasonic sound) and the other of the assistant devices 110A and 110B can attempt to detect the emitted signal. If the other of the assistant devices 110A and 110B detects the emitted signal, optionally with a threshold strength, then it can indicate they are positionally proximate to one another. Additional and/or alternative techniques to determine temporal proximity and/or automatically generate a device group can be utilized.

Regardless of how the group 101B was generated, FIG. 1B1 shows one example of adaptations that can be made to the assistant devices 110A and 110B responsive to them being included in the group 101B. In various implementations, one or both of the assistant clients 120A and 120B can determine the adaptations that should be made and cause those adaptations to occur. In other implementations, one or more engine(s) of the cloud based assistant component(s) 140 can additionally or alternatively determine the adaptations that should be made and cause those adaptations to occur. As described herein, the adaptations to be made can be determined based on considering the processing capabilities of both of the assistant clients 120A and 120B. For example, the adaptations can seek to utilize as much of the collective processing capabilities as possible, while ensuring that individual processing capabilities of each of the assistant device(s) is sufficient for the engine(s) and/or model(s) to be locally stored and utilized at the assistant. Further, the adaptations to be made can also be determined based on usage data that reflects metric(s) related to actual usage of assistant device(s) of the group and/or of other non-grouped assistant devices of an ecosystem. For example, if processing capabilities allow for either larger but more accurate wake cue(s) model(s) or larger but more robust warm cue(s) models, but not both, usage data can be utilized to select between the two options. For instance, if usage data reflects rare (or even no) usage of warm words and/or that detection of wake words are often barely over the threshold and/or that false negatives for wake words are often encountered, then the larger but more accurate wake cue(s) model(s) can be chosen. On the other hand, if usage data reflects frequent usage of warm words and/or that detection of wake words are consistently over the threshold and/or that false negative for wake words are rare, then the larger but more accurate warm cue(s) model(s) can be chosen. Consideration of such usage data can be what determines whether the adaptation of FIG. 1B1, 1B2, or 1B3 is selected—as FIG. 1B1, 1B2, or 1B3 each show a different adaptation for the same group 101B.

In FIG. 1B1, the fulfillment engine 124A1 and fulfillment model(s) 134A1 and TTS engine 125A1 and TTS model(s) 135A1 have been purged from the assistant device 110A. Further, the assistant device 110A has a different ASR engine 122A2 and different on-device ASR model(s) 132A2, as well as a different NLU engine 123A2 and different on-device NLU model(s) 133A2. The different engines can be downloaded, at the assistant device 110A, from a local models repository 150 that is accessible via interaction with the cloud based assistant component(s) 140. In FIG. 1B1, the wake cue(s) engine 121B1, ASR engine 122B1, and authentication engine 126B1, and their corresponding models 131B1, 133B1, and 136B1, have been purged from the assistant device 110B. Further, the assistant device 110B has a different NLU engine 123B2 and different on-device NLU model(s) 133B2, a different fulfillment engine 124B2 and fulfillment model(s) 133B2, and different warm word engine 127B2 and warm word model(s) 137B2. The different engines can be downloaded, at the assistant client 110B, from a local models repository 150 that is accessible via interaction with the cloud based assistant component(s) 140.

The ASR engine 122A2 and ASR model(s) 132A2 of assistant device 110A can be more robust and/or more accurate than, but occupy more disk space, utilize more memory, and/or require greater processor resource(s) than, the ASR engine 122A1 and ASR model(s) 132A1. For example, the ASR model(s) 132A1 can include only a single pass model, and the ASR model(s) 132A2 can include a two-pass model.

Likewise, the NLU engine 123A2 and NLU model(s) 133A2 can be more robust and/or more accurate than, but occupy more disk space, utilize more memory, and/or require greater processor resource(s) than, the NLU engine 123A1 and the NLU model(s) 133A1. For example, the NLU model(s) 133A1 may have only included intent(s) and parameter(s) for a first classification such as "lighting control", but the NLU model(s) 133A2 can include intent(s) for "lighting control" as well as "thermostat control", "smart lock control", and "reminders".

Accordingly, the ASR engine 122A2, ASR model(s) 132A2, NLU engine 123A2, and NLU model(s) 133A2 are improved relative to their replaced counterparts. However, it is noted that the processing capabilities of the assistant device 110A can prevent storage and/or use of the ASR engine 122A2, ASR model(s) 132A2, NLU engine 123A2, and NLU model(s) 133A2 without first purging of the fulfillment engine 124A1 and fulfillment model(s) 134A1 and TTS engine 125A1 and TTS model(s) 135A1. Simply purging such models from the assistant device 110A, without complimentary adaptations to assistant device 110B and cooperative processing with assistant device 110B, would result in the assistant client 120A lacking capabilities for processing various assistant requests fully locally (i.e., without necessitating utilization of one or more cloud based assistant component(s) 140).

Accordingly, complementary adaptations are made to the assistant device 110B and cooperative processing between the assistant devices 110A and 110B occurs after the adaptations. The NLU engine 123B2 and NLU model(s) 133B2 for the assistant device 110B can be more robust and/or more accurate than, but occupy more disk space, utilize more memory, and/or require greater processor resource(s) than, the NLU engine 123B1 and the NLU model(s) 133B1. For example, the NLU model(s) 133B1 may have only included intent(s) and parameter(s) for a first classification such as "lighting control". However, the NLU model(s) 133B2 can cover a greater quantity of intents and parameters. It is noted that the intents and parameters covered by the NLU model(s) 133B2 can be restricted to intents that are not already covered by the NLU model(s) 133A2 of assistant client 120A. This can prevent duplication of functionalities between the assistant clients 120A and 120B and expands the collective capabilities when the assistant clients 120A and 120B cooperatively process assistant requests.

Likewise, the fulfillment engine 124B2 and fulfillment model(s) 134B2 can be more robust and/or more accurate than, but occupy more disk space, utilize more memory, and/or require greater processor resource(s) than, the fulfillment engine 124B1 and the fulfillment model(s) 124B1. For example, the fulfillment model(s) 124B1 may have only included fulfillment capabilities for the single classification of the NLU model 133B1, but the fulfillment model(s) 124B2 can include fulfillment capabilities for all the classifications of the NLU model 133B2 as well as for the NLU model 133A2.

Accordingly, the fulfillment engine 124B2, fulfillment model(s) 134B2, NLU engine 123B2, and NLU model(s) 133B2 are improved relative to their replaced counterparts. However, the processing capabilities of the assistant device 110B can prevent storage and/or use of the fulfillment engine 124B2, fulfillment model(s) 134B2, NLU engine 123B2, and NLU model(s) 133B2 without first purging of the purged models and purged engines from the assistant device 110B. Simply purging such models from the assistant device 110B, without complimentary adaptations to assistant device 110A and cooperative processing with assistant device 110A, would result in the assistant client 120B lacking capabilities for processing various assistant requests fully locally.

The warm cue(s) engine 127B2 and warm cue(s) model 137B2 of client device 110B does not occupy any additional disk space, utilize more memory than, or require greater processor resources than the warm cue(s) engine 127B1 and warm cue(s) model 127B1. For example, they can require the same or even lesser processing capabilities. However, the warm cue(s) engine 127B2 and warm cue(s) model 137B2 cover warm cue(s) that are in addition to those covered by warm cue(s) engine 127B1 and warm cue(s) model 127B1—and that are in addition to those covered by warm cue(s) engine 127A1 and warm cue(s) model 127A1 of assistant client 120A.

In the configuration of FIG. 1B1, assistant client 120A can be assigned the processing roles of: monitoring for wake cue(s), performing ASR, performing NLU for a first set of classifications, performing authentication, monitoring for a first set of warm cues, and performing VAD. Assistant client 120B can be assigned the processing roles of: performing NLU for a second set of classifications, performing fulfillment, performing US, and monitoring for a second set of warm cues. The processing roles can be communicated and stored at each of the assistant clients 120A, and coordination of the processing of various assistant requests can be performed by one or both of the assistant clients 120A and 120B.

As one example of cooperative processing of an assistant request using the adaptations of FIG. 1B1, assume a spoken utterance of "OK Assistant, turn on the kitchen lights" is provided and that assistant device 120A is the lead device that coordinates the processing. The wake cue(s) engine 121A1 of assistant client 120A can detect occurrence of the wake cue "OK Assistant". In response, the wake cue(s) engine 121A1 can cause the ASR engine 122A2 to process captured audio data that follows the wake cue. The wake cue(s) engine 121A1 can also optionally locally transmit a command to assistant device 110B to cause it to transition from a lower-power state to a higher-power state in order to ready the assistant client 120B to perform certain processing of the assistant request. The audio data that is processed by the ASR engine 122A2 can be audio data captured by microphone(s) of the assistant device 110A and/or audio data captured by microphone(s) of the assistant device 110B. For example, the command transmitted to the assistant device 110B to cause it to transition to a higher-power state can also cause it to capture audio data locally, and to optionally transmit such audio data to the assistant client 120A. In some implementations, the assistant client 120A can determine whether to use that received audio data or, instead, locally captured audio data, based on analysis of characteristic(s) of the respective instances of audio data. For example, an instance of audio data can be utilized over another instance based on the instance having a lower signal to noise ratio and/or capturing the spoken utterance with a higher volume.

The transcription generated by the ASR engine 122A2 can be communicated to the NLU engine 123A2 for performing NLU on the transcription for the first set of classifications and also transmitted assistant client 120B to cause NLU engine 123B2 to perform NLU on the transcription for the second set of classifications. The results of the NLU performed by NLU engine 123B2 can be transmitted to assistant client 120A and it can be determined, based on those results and results from NLU engine 123A2, which results to utilize, if any. For example, the assistant client 120A can utilize the results with the highest probability intent, so long as that probability satisfies some threshold. For instance, the results that include an intent of "turn on" and parameter(s) that specify an identifier for the "kitchen lights" can be utilized. It is noted that if no probabilities satisfy the threshold, an NLU engine of cloud based assistant component(s) 140 can optionally be utilized to perform NLU. The assistant client 120A can transmit the NLU results with the highest probability to the assistant client 120B. The fulfillment engine 124B2 of the assistant client 120B can utilize those NLU results to determine command(s) to transmit to the "kitchen lights" to cause them to transition to an "on" state, and transmit such command over LAN(s) 108. Optionally, the fulfillment engine 124B2 can utilize the TTS engine 125B1 to generate synthesized speech that confirms the performance of "turning on the kitchen lights". In such a situation, the synthesized speech can be rendered at the assistant device 110B by the assistant client 120B and/or transmitted to the assistant device 110A for rendering by the assistant client 120A.

As another example of cooperative processing of assistant requests, assume that assistant client 120A is rendering an alarm for a local timer at assistant client 120A that has just expired. Further assume that the warm cues being monitored by the warm cues engine 127B2 include "stop" and that the warm cues being monitored by the warm cues engine 127A1 do not include "stop". Finally, assume that, when the alarm is being rendered, a spoken utterance of "stop" is provided, and is captured in audio data detected via microphones of the assistant client 120B. The warm words engine 127B2 can process the audio data and determine occurrence of the word "stop". Further, the warm words engine 127B2 can determine that occurrence of the word stop is mapped directly to a command that clears the audibly sounding timer or alarm. That command can be transmitted, by the assistant client 120B to the assistant client 120A, to cause the assistant client 120A to implement that command and clear the audibly sounding timer or alarm. In some implementations, the warm words engine 127B2 may only monitor for an occurrence of "stop" in certain situations. In those implementations, the assistant client 120A can transmit, responsive to or in anticipation of the rendering of the alarm, a command to cause the warm words engine 127B2 to monitor for occurrence of "stop". The command can cause the monitoring to occur for a certain time period or, alternatively, until a cessation of monitoring command is sent.

Figure 1C:
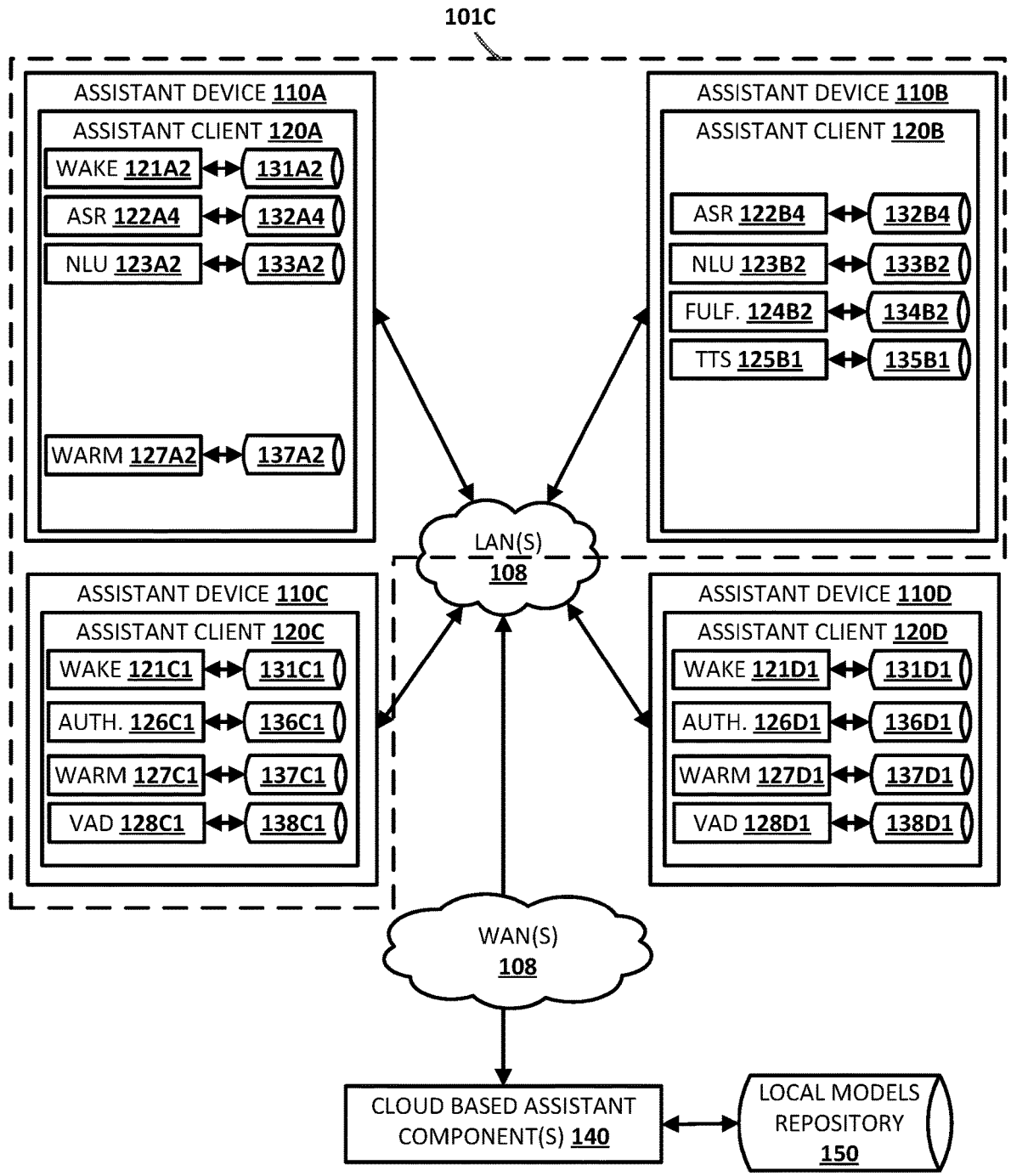
FIG. 1C illustrates the example assistant ecosystem of FIG. 1A, with a first assistant device, a second assistant device, and a third assistant device having been grouped, and with an example of adaptations that can be implemented.
Figure 1D:
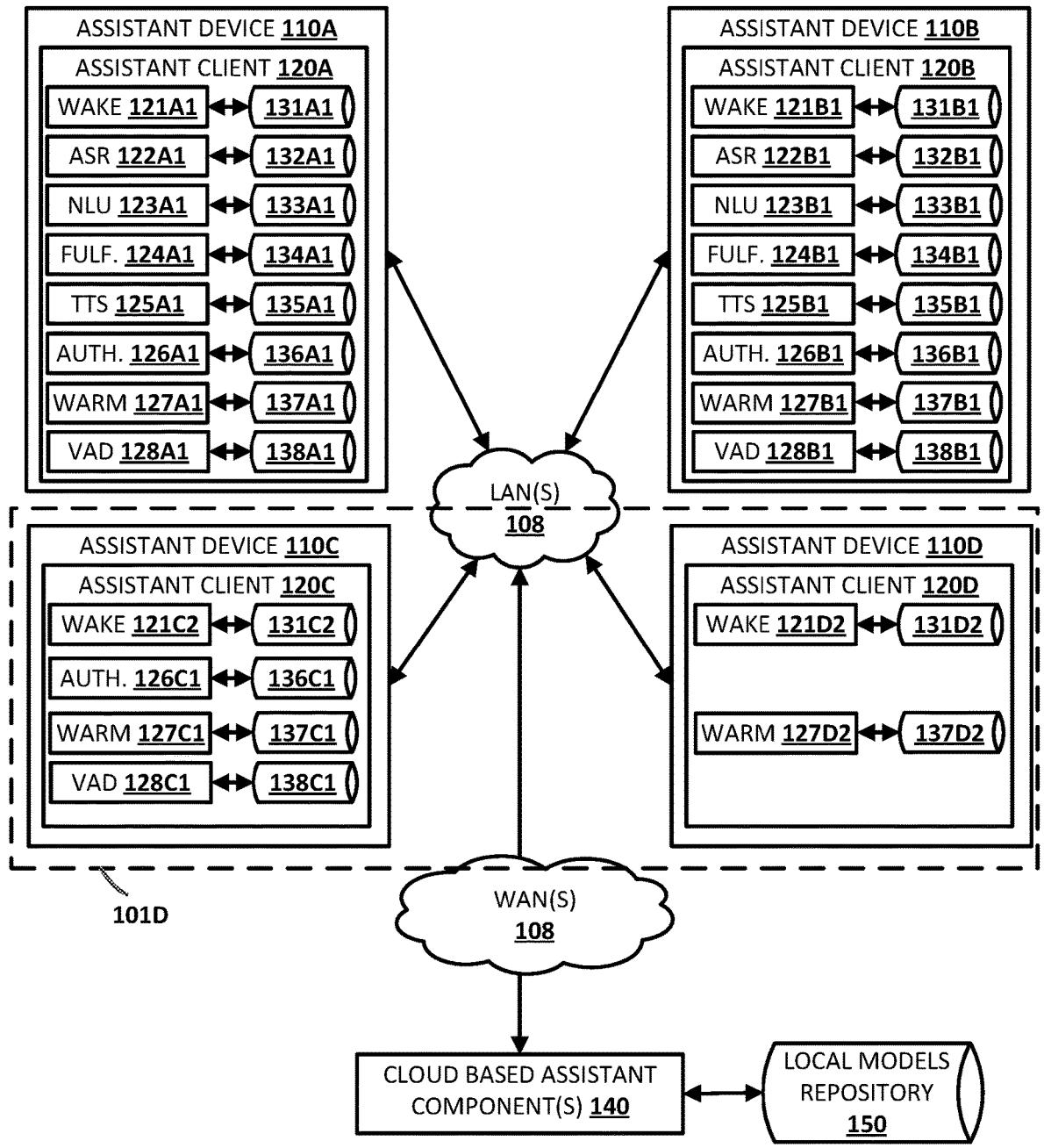
FIG. 1D illustrates the example assistant ecosystem of FIG. 1A, with a third assistant device and a fourth assistant device having been grouped, and with an example of adaptations that can be implemented.
Figure 2:
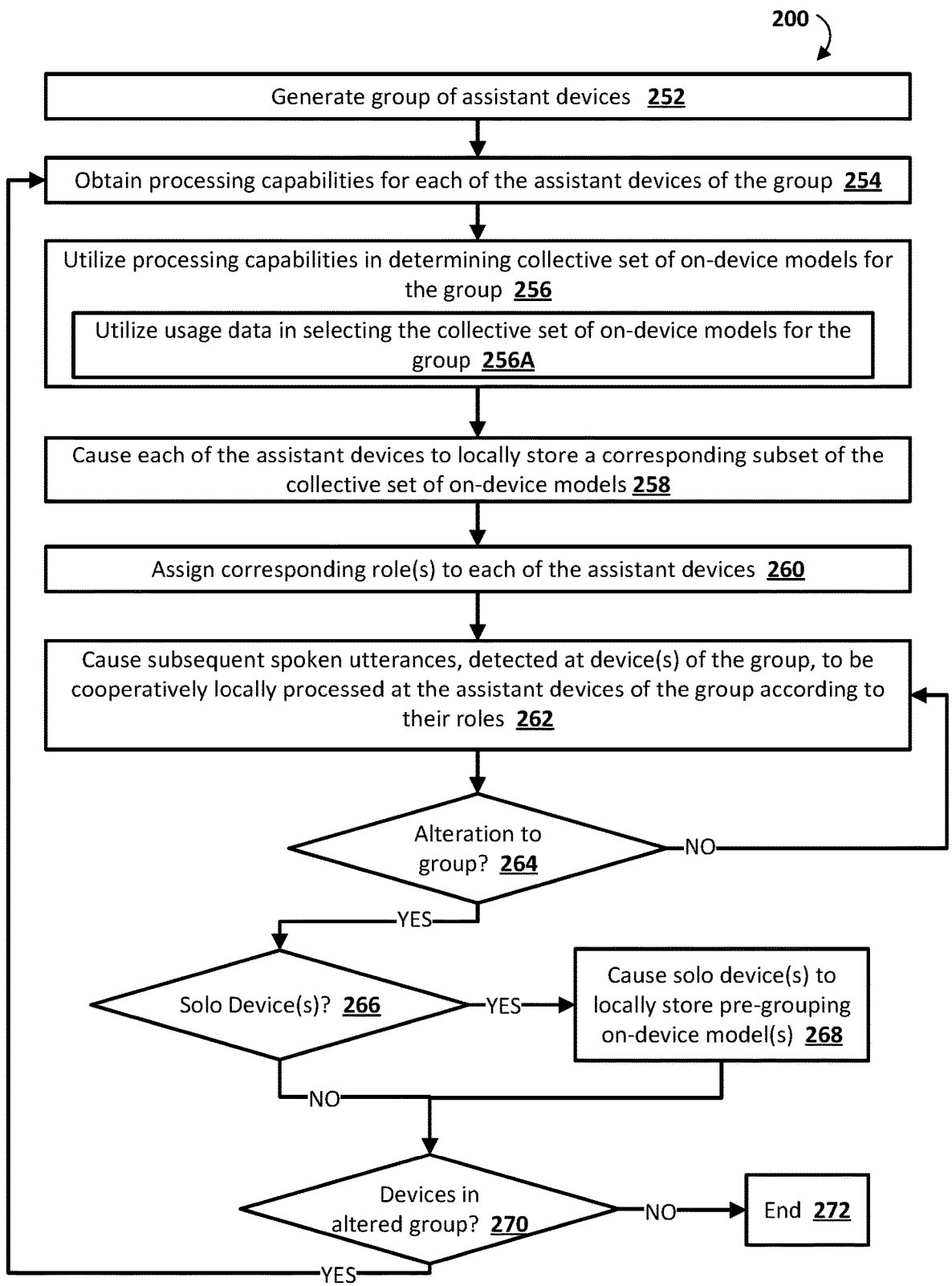

Turning now to FIG. 1B2, the same group 101B is illustrated. In FIG. 1B2, the same adaptations have been made as in FIG. 1B1, with the exception being that ASR engine 121A1 and ASR model(s) 132A1 have not been replaced by ASR engine 122A2 and ASR model(s) 132A2. Rather, ASR engine 121A1 and ASR model(s) 132A1 remain and an additional ASR engine 122A3 and additional ASR model(s) 132A3 are provided.

The ASR engine 121A1 and ASR model(s) 132A1 can be for speech recognition of utterances in a first language (e.g., English) and the additional ASR engine 122A3 and additional ASR model(s) 132A3 can be for speech recognition of utterances in a second language (e.g., Spanish). The ASR engine 121A2 and ASR model(s) 132A2 of FIG. 1B1 can also be for the first language, and can be more robust and/or accurate than ASR engine 121A1 and ASR model(s) 132A1. However, the processing capabilities of the assistant client 120A can prevent ASR engine 121A2 and ASR model(s) 132A2 from being locally stored along with ASR engine 122A3 and additional ASR model(s) 132A3. Yet, the processing capabilities enable storing and utilization of both the ASR engine 121A1 and ASR model(s) 132A1 and the additional ASR engine 122A3 and additional ASR model(s) 132A3.

The decision to locally store both the ASR engine 121A1 and ASR model(s) 132A1 and the additional ASR engine 122A3 and additional ASR model(s) 132A3, in lieu of the ASR engine 121A2 and ASR model(s) 132A2 of FIG. 1B1, can be based on, in the example of FIG. 1B2, usage statistics indicating that spoken utterances provided at the assistant devices 110A and 110B (and/or assistant devices 110C and 110D) include both first language spoken utterances and second language spoken utterances. In the example of FIG. 1B1, usage statistics can indicate only spoken utterances of the first language, resulting in the selection of the more robust ASR engine 121A2 and ASR model(s) 132A2 in FIG. 1B1.

Figure 3:
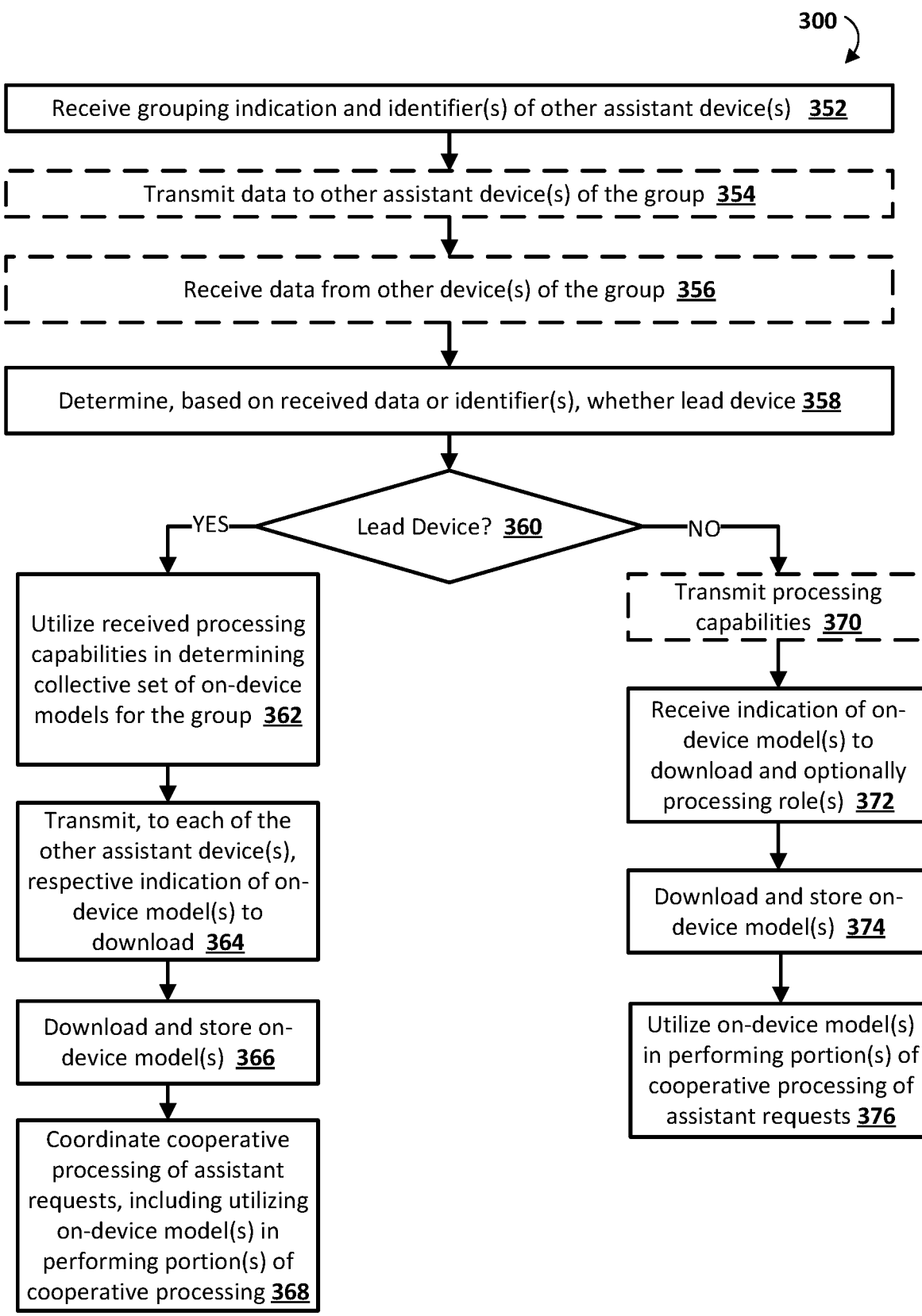

Turning now to FIG. 1B3, the same group 101B is again illustrated. In FIG. 1B3, the same adaptations have been made as in FIG. 1B1, with the exceptions being: (1) that ASR engine 121A1 and ASR model(s) 132A1 are replaced by ASR engine 122A4 and ASR model(s) 132A4 instead of by ASR engine 122A2 and ASR model(s) 132A2; (2) no warm cue(s) engine or warm cue(s) model(s) are present on assistant device 110B; and (3) ASR engine 122B4 and ASR model(s) 132B4 are locally stored and utilized on assistant device 110B.

The ASR engine 122A4 and ASR model(s) 132A4 can be utilized to perform a first portion of speech recognition and the ASR engine 122B4 and the ASR model(s) 132B4 can be utilized to perform a second portion of the speech recognition. For example, the ASR engine 122A4 can utilize the ASR model(s) 132A4 to generate output, the output transmitted to assistant client 120B, and the ASR engine 122B4 can process the output in generating a recognition of the speech. As one particular example, the output can be a graph that represents candidate recognitions and the ASR engine 122B4 can perform a beam search on the graph in generating the recognition of the speech. As another particular example, the ASR model(s) 132A4 can be an initial/downstream portion (i.e., first neural network layer(s)) of an end-to-end speech recognition model and the ASR model(s) 132B4 can be a later/upstream portion (i.e., second neural network layer(s)) of the end-to-end speech recognition model. In such an example, the end-to-end model is split between the two assistant devices 110A and 110B output can be the states of the last layer (e.g., an embedding) of the initial portion after the processing. As yet another example, the ASR model(s) 132A4 can be an acoustic model and the ASR model(s) 132B4 can be language model(s). In such an example, the output can indicate a sequence of phonemes, or a sequence of probability distributions for phonemes, and the ASR engine 122B4 can utilize the language model to select a transcription/recognition that corresponds to the sequence.

The robustness and/or accuracy of the ASR engine 122A4, ASR model(s) 132A4, ASR engine 122B4, and the ASR model(s) 132B4, working cooperatively, can surpass that of the ASR engine 122A2 and ASR model(s) 132A2 of FIG. 1B1. Further, the processing capabilities of the assistant client 120A and assistant client 120B can prevent ASR model(s) 132A4 and 132B4 from being stored and utilized on either of the devices singularly. However, the processing capabilities can enable splitting of the models and splitting of the processing roles between the ASR engines 122A4 and 122B4 as described herein. It is noted that, on assistant device 110B, the purging of the warm cue(s) engine and the warm cue(s) model can be to enable storage and utilization of the ASR engine 122B4 and the ASR model(s) 132B4. Put another way, processing capabilities of the assistant device 110B would not enable the warm cue(s) engine and the warm cue(s) model to be stored and/or utilized along with the other engines and models illustrated in FIG. 1B3.

The decision to locally store ASR engine 122A4, ASR model(s) 132A4, ASR engine 122B4, and the ASR model(s) 132B4, in lieu of the ASR engine 121A2 and ASR model(s) 132A2 of FIG. 1B1, can be based on, in the example of FIG. 1B3, usage statistics indicating that speech recognitions at the assistant devices 110A and 110B (and/or assistant devices 110C and 110D) are often low-confidence and/or often inaccurate. For example, usage statistics can indicate that confidence metrics for recognitions are below average (e.g., an average based on a population of users) and/or that the recognitions are often corrected by the user (e.g., through editing of a display of the transcription).

Turning now to FIG. 1C, a device group 101C has been made in which assistant devices 110A, 110B, and 110C are included in the device group 101C. In some implementations, the device group 101C can be generated responsive to user interface input that explicitly indicates a desire to group the assistant devices 110A, 110B, and 110C. For example, the user interface input can indicate a desire to create the device group 101C from scratch or, alternatively, to add the assistant device 110C to the device group 101B (FIGS. 1B1, 1B2, and 1B3), thereby creating a modified group 101C. In some implementations, the device group 101C can instead be generated automatically. For example, the device group 101B (FIGS. 1B1, 1B2, and 1B3) may have been previously generated based on determining that assistant devices 110A and 110B are in close proximity and, after creation of device group 101B, assistant device 110C can be moved by a user such that it is now proximal to devices 110A and 110B. As a result, the assistant device 110C can be automatically added to the device group 101B, thereby creating a modified group 101C.

Regardless of how the group 101C was generated, FIG. 1C shows one example of adaptations that can be made to the assistant devices 110A, 110B, and 110C responsive to them being included in the group 101C.

In FIG. 1C, the assistant device 110B has the same adaptations as it does in FIG. 1B3. Further, the assistant device 110A the same adaptations as it does in FIG. 1B3, with the exceptions being: (1) that authentication engine 126A1 and VAD engine 128A1, and their corresponding models 13A1 and 138A1 have been purged; (2) the wake cue(s) engine 121A1 and wake cue(s) model(s) 131A1 have been replaced with wake cue(s) engine 121A2 and wake cue(s) model(s) 131A2; and (3) no warm cue(s) engine or warm cue(s) model(s) are present on assistant device 110B. The models and engines stored on assistant device 110C have not been adapted. However, assistant client 120C can be adapted to enable cooperative processing, of assistant requests, with assistant client 120A and assistant client 120B.

In FIG. 1C, the authentication engine 126A1 and VAD engine 128A1 have been purged from the assistant device 110A as counterparts already exist on the assistant device 110C. In some implementations, the authentication engine 126A1 and/or VAD engine 128A1 can be purged only after some or all data from those component(s) is merged with their counterparts that already exist on the assistant device 110C. As one example, the authentication engine 126A1 can store a voice embedding for a first user and a second user, but the authentication engine 126C1 may only store the voice embedding for the first user. Prior to purging the authentication engine 126A1, the voice embedding for the second user can be locally transmitted to the authentication engine 126C1 so that such voice embedding can be utilized by the authentication engine 126C1, ensuring pre-adaptation capabilities are maintained post-adaptation. As another example, the authentication engine 126A1 can store instances of audio data that each captures an utterance of a second user and that was utilized to generate a voice embedding for the second user, and the authentication engine 126C1 can lack any voice embedding for the second user. Prior to purging the authentication engine 126A1, the instances of audio data can be locally transmitted from the authentication engine 126A1 to the authentication engine 126C1 so that the instances of audio data can be utilized by the authentication engine 126C1 in generating a voice embedding, for the second user, utilizing the on-device authentication model(s) 136C1, ensuring pre-adaptation capabilities are maintained post-adaptation. Further, the wake cue(s) engine 121A1 and wake cue(s) model(s) 131A1 have been replaced with smaller storage size wake cue(s) engine 121A2 and wake cue(s) model(s) 131A2. For example, the wake cue(s) engine 121A1 and wake cue(s) model(s) 131A1 enabled detection of both spoken wake cue(s) and image based wake cue(s), whereas the wake cue(s) engine 121A2 and wake cue(s) model(s) 131A2 enable detection of only image based wake cue(s). Optionally, personalization(s), training instance(s), and/or other setting(s) from the image based wake cue(s) portion of the wake cue(s) engine 121A1 and wake cue(s) model(s) 131A1 can be merged with, or otherwise shared with, the wake cue(s) engine 121A2 and wake cue(s) model(s) 131A2 prior to purging of the wake cue(s) engine 121A1 and wake cue(s) model(s) 131A1. The wake cue(s) engine 121C1 and wake cue(s) model 131C1 enables detection of only spoken wake cue(s). Accordingly, the wake cue(s) engine 121A2 and wake cue(s) model(s) 131A2, and the wake cue(s) engine 121C1 and wake cue(s) model 131C1 collectively enable detection of both spoken and image based wake cues. Optionally, personalization(s) and/or other setting(s) from the spoken cue(s) portion of the wake cue(s) engine 121A1 and wake cue(s) model(s) 131A1 can be transmitted to client device 110C for merging with, or otherwise sharing with, the wake cue(s) engine 121C1 and wake cue(s) model 131C1.

Further, replacing the wake cue(s) engine 121A1 and wake cue(s) model(s) 131A1 with the smaller storage size wake cue(s) engine 121A2 and wake cue(s) model(s) 131A2 provides for extra storage space. That extra storage space, as well as the extra storage space afforded by purging authentication engine 126A1 and VAD engine 128A1, and their corresponding models 13A1 and 138A1, provides space for the warm cue(s) engine 127A2 and warm cue(s) model 137A2 (which are collectively larger than the warm cue(s) engine 127A1 and warm cue(s) model they replaced). The warm cue(s) engine 127A2 and warm cue(s) model 137A2 can be utilized to monitor for different warm cue(s) than those monitored utilizing warm cue(s) engine 127C1 and warm cue(s) model 137C1.

As one example of cooperative processing of an assistant request using the adaptations of FIG. 1C, assume a spoken utterance of "OK Assistant, turn on the kitchen lights" is provided and that assistant device 120A is the lead device that coordinates the processing. The wake cue(s) engine 121C1 of assistant client 110C can detect occurrence of the wake cue "OK Assistant". In response, the wake cue(s) engine 121C1 can transmit, to assistant devices 110A and 110B command(s) to cause the ASR engines 122A4 and 122B4 to cooperatively process captured audio data that follows the wake cue. The audio data that is processed can be audio data captured by microphone(s) of the assistant device 110C and/or audio data captured by microphone(s) of the assistant device 110B and/or by the assistant device 110C.

The transcription generated by the ASR engine 122B4 can be communicated to the NLU engine 123B2 for performing NLU on the transcription for the second set of classifications and also transmitted assistant client 120A to cause NLU engine 123A2 to perform NLU on the transcription for the first set of classifications. The results of the NLU performed by NLU engine 123B2 can be transmitted to assistant client 120A and it can be determined, based on those results and results from NLU engine 123A2, which results to utilize, if any. The assistant client 120A can transmit the NLU results with the highest probability to the assistant client 120B. The fulfillment engine 124B2 of the assistant client 120B can utilize those NLU results to determine command(s) to transmit to the "kitchen lights" to cause them to transition to an "on" state, and transmit such command over LAN(s) 108. Optionally, the fulfillment engine 124B2 can utilize the TTS engine 125B1 to generate synthesized speech that confirms the performance of "turning on the kitchen lights". In such a situation, the synthesized speech can be rendered at the assistant device 110B by the assistant client 120B, transmitted to the assistant device 110A for rendering by the assistant client 120A, and/or transmitted to the assistant device 110C for rendering by the assistant client 120C.

Turning now to FIG. 1D, a device group 101D has been made in which assistant devices 110C and 110D are included in the device group 101D. In some implementations, the device group 101D can be generated responsive to user interface input that explicitly indicates a desire to group the assistant devices 110C and 110D. In some implementations, the device group 101D can instead be generated automatically.

Regardless of how the group 101D was generated, FIG. 1D shows one example of adaptations that can be made to the assistant devices 110C and 110D responsive to them being included in the group 101D.

In FIG. 1D, the wake cue(s) engine 121C1 and wake cue(s) model(s) 131C1 of assistant device 110C are replaced with wake cue(s) engine 121C2 and wake cue(s) model(s) 131C2. Further, the authentication engine 126D1 and authentication model(s) 136D1 and the VAD engine 128D1 and VAD model(s) 138D2 are purged from the assistant device 110D. Yet further, the wake cue(s) engine 121D1 and wake cue(s) model(s) 131D1 of assistant device 110D are replaced with wake cue(s) engine 121D2 and wake cue(s) model(s) 131D2, and the warm cue(s) engine 127D1 and warm cue(s) model(s) 137D1 are replaced with warm cue(s) engine 127D2 and warm cue(s) model(s) 137D2.

The previous wake cue(s) engine 121C1 and wake cue(s) model(s) 131C1 could only be utilized to detect a first set of one or more wake words such as "Hey Assistant" and "OK Assistant". On the other hand, the wake cue(s) engine 121C2 and wake cue(s) model(s) 131C2 can only detect an alternate second set of one or more wake words such as "Hey Computer" and "OK Computer". The previous wake cue(s) engine 121D1 and wake cue(s) model(s) 131D1 could also only be utilized to detect the first set of one or more wake words and the wake cue(s) engine 121D2 and wake cue(s) model(s) 131D2 can also only be utilized to detect the first set of one or more wake words. However, the wake cue(s) engine 121D2 and wake cue(s) model(s) 131D2 are larger than their replaced counterparts and are also more robust (e.g., more robust to background noise) and/or more accurate. Purging of the engines and models from assistant device 110D can enable the larger sized wake cue(s) engine 121D2 and wake cue(s) model(s) 131D2 to be utilized. Further, collectively, the wake cue(s) engine 121C2 and wake cue(s) model(s) 131C2 and the wake cue(s) engine 121D2 and wake cue(s) model(s) 131D2 enable detection of two sets of wake words, whereas each of assistant client 120C and 120D could only detect the first set prior to adaptation.

The warm cue(s) engine 127D2 and warm cue(s) model 137D2 of assistant device 110D can require more computational capabilities than the replaced wake cue(s) engine 127D1 and wake cue(s) model(s) 137D1. However, these capabilities are available through the purging of the purging of the engines and models from assistant device 110D.

Moreover, the warm cue(s) monitored by warm cue(s) engine 127D2 and warm cue(s) model 137D1 can be in addition to those monitored by warm cue(s) engine 127C1 and warm cue(s) model 137D1. Pre-adaptation, the wake cue(s) monitored by wake cue(s) engine 127D1 and wake cue(s) model(s) 137D1 were the same as those monitored by warm cue(s) engine 127C1 and warm cue(s) model 137D1. Accordingly, through cooperative processing the assistant client 120C and assistant client 120D can monitor for a larger quantity of wake cue(s).

It is noted that, in the example of FIG. 1D, there are many assistant requests that cannot be fully processed on-device cooperatively by the assistant client 120C and 120D. For example, assistant client 120C and 120D lack any ASR engine, lack any NLU engine, and lack any fulfillment engine. This can be due to processing capabilities of assistant devices 110C and 110D not supporting any such engines or models. Accordingly, for spoken utterances that are not a warm cue supported by assistant clients 120C and 120D, the cloud based assistant component(s) 140 will still need to be utilized in fully processing many assistant requests. However, the adaptation of FIG. 1D and cooperative processing based on the adaptations can still be more robust and/or accurate than any processing that occurred at the devices individually pre-adaptation. For example, the adaptation enables detection of additional wake cue(s) and of additional warm cue(s).

As one example of cooperative processing that can occur, assume a spoken utterance of "OK Computer, play some music". In such an example, the wake cue(s) engine 121D2 can detect the wake cue "OK Computer". In response the wake cue(s) engine 121D2 can cause audio data, that corresponds to the wake cue, to be transmitted to assistant client 120C. Authentication engine 126C1 of the assistant client 120C can utilize the audio data to determine whether the speaking of the wake cue can be authenticated to a registered user. The wake cue(s) engine 121D2 can further cause audio data, that follows the spoken utterance, to be streamed to the cloud based assistant component(s) 140 for further processing. The audio data can be captured at the assistant device 110D, or at the assistant device 110C (e.g., the assistant client 120 can transmit a command to assistant client 120C to cause it to capture audio data, in response to wake cue(s) engine 121D2 detecting the wake cue). Further, authentication data based on the output of the authentication engine 126C1 can also be transmitted along with the audio data. For example, if the authentication engine 126C1 authenticates speaking of the wake cue to the registered user, the authentication data can include an identifier of the registered user. As another example, if the authentication engine 126C1 does not authenticate speaking of the wake cue to any registered user, the authentication data can include an identifier that reflects the utterance is provided by a guest user.

Various particular examples have been described with reference to FIGS. 1B1, 1B2, 1B3, 1C, and 1D. However, it is noted that various additional or alternative groups can be generated and/or various additional or alternative adaptations can be performed responsive to generation of a group.

FIG. 2 is a flowchart illustrating an example method 200 of adapting on-device model(s) and/or processing role(s) of assistant devices in a group. For convenience, the operations of the flow chart are described with reference to a system that performs the operations. This system may include various components of various computer systems, such as one or more of the assistant clients 120A-D of FIG. 1 and/or component(s) of cloud based assistant component(s) 140 of FIG. 1. Moreover, while operations of method 200 are shown in a particular order, this is not meant to be limiting. One or more operations may be reordered, omitted or added.

At block 252, the system generates a group of assistant devices. For example, the system can generate the group of assistant devices in response to user interface input that explicitly indicates a desire to generate the group. As another example, the system can automatically generate the group responsive to determining one or more conditions are satisfied. As yet another example, the system can automatically determine that the group should be generated, responsive to determining condition(s) are satisfied, provide user interface output suggesting generation of the group, then generate the group responsive to affirmative user interface being received in response to the user interface output.

At block 254, the system obtains processing capabilities for each of the assistant devices of the group. For example, the system can be one of the assistant devices of the group. In such an example, the assistant device can obtain its own processing capabilities and the other assistant devices of the group can transmit their processing capabilities to the assistant device. As another example, the processing capabilities of the assistant devices can be stored in a device topology and the system can retrieve them from the device topology. As yet another example, the system can be a cloud based component and the assistant devices of the group can each transmit their processing capabilities to the system.

The processing capabilities for an assistant device can include a corresponding processor value based on capabilities of one or more on-device processors, a corresponding memory value based on size of on-device memory, and/or a corresponding disk space value based on available disk space. For example, the processor value can include details on the operating frequency/frequencies of the processor(s), details on the size of cache(s) of the processor(s), whether each of processor(s) is GPU, CPU, or DSP, and/or other detail(s). As another example, the processor value can additionally or alternative include a higher-level categorization of the capabilities of the processor(s) such as high, medium, or low or GPU+CPU+DSP, high-power CPU+DSP, mid-power CPU+DSP, or low-power CPU+DSP. As another example, the memory value can include details of the memory such as a specific size of the memory, or can include a higher-level categorization of the memory such as high, medium, or low. As yet another example, the disk space value can include details on the available disk space such as a specific size of the disk space, or can include a higher-level categorization of the available disk space such as high, medium, or low.

At block 256, the system utilizes the processing capabilities of block 254 in determining a collective set of on-device models for the group. For example, the system can determine a set of on-device models that seeks to maximize usage of the collective processing capabilities, while ensuring that the on-device models of the set can each be locally stored and utilized on a device that can store and utilize the on-device model. The system can also seek to ensure, if possible, that the selected set includes a complete (or more complete than other candidate sets) pipeline of on-device model(s). For example, the system can select a set that includes an ASR model but a less robust NLU model over a set that includes a more robust NLU model but no ASR model.

In some implementations, block 256 includes sub-block 256A, in which the system utilizes usage data in selecting the collective set of on-device models for the group. The past usage data can be data related to past assistant interactions at one or more of the assistant devices of the group and/or at one or more additional assistant devices of an ecosystem. In some implementations, at sub-block 256A the system considers, along with consideration(s) noted above, usage data in selecting on-device model(s) to include in the set. For example, if processing capabilities would allow for a more accurate ASR model (instead of a less accurate ASR model) or a more robust NLU model (instead of a less robust NLU model) to be included, but not both, in a set, usage data can be used to determine which to select. For instance, if the usage data reflects that past assistant interactions were mainly (or exclusively) directed to intent(s) covered by a less robust NLU model that could be included in a set with the more accurate ASR model, then the more accurate ASR model can be selected for inclusion in the set. On the other hand, if the usage data reflects that past assistant interactions included many directed to intent(s) covered by the more robust NLU model but not by the less robust NLU model, then the more robust NLU model can be selected for inclusion in the set. In some implementations, candidate set(s) are first determined based on processing capabilities and without consideration of usage data and then, if multiple valid candidate set(s) exist, usage data can be utilized to select one over the other(s).

At block 258, the system causes each of the assistant devices to locally store a corresponding subset of the collective set of on-device models. For example, the system can communicate, to each of the assistant devices of the group, a corresponding indication of what on-device model(s) should be downloaded. Based on the received indication, each of the assistant devices can then download corresponding model(s) from remote database(s). As another example, the system can retrieve the on-device models and push the corresponding on-device model(s) to each of the assistant devices of the group. As yet another example, for any on-device model(s) that pre-adaptation are stored at a corresponding one of the assistant devices of the group and that in the adaptation are to be stored at a corresponding another one of the assistant devices of the group, such model(s) can be directly communicated between respective devices. For instance, assume a first assistant device stores an ASR model pre-adaptation and that same ASR model, in the adaptation, is to be stored on a second assistant device and purged from the first assistant device. In such an instance, the system can direct the first assistant device to transmit the ASR model to the second assistant device for local storage at the second assistant device (and/or direct the second assistant device to download it from the first assistant device), and the first assistant device can subsequently purge the ASR model. In addition to preventing WAN traffic, locally transmitting the pre-adaptation model(s) can maintain any personalization of those on-device model(s) that previously occurred at the transmitting. Model(s) that are personalized can be more accurate, for the user(s) of the ecosystem, than their non-personalized counterpart(s) in remote storage. As yet one further example, for any assistant device(s) that, pre-adaptation, include stored training instance(s) for personalizing on-device model(s) on those assistant device(s) pre-adaptation, such training instance(s) can be communicated to the assistant device(s) that will have, post-adaptation, corresponding model(s) downloaded from remote database(s). The assistant device(s) with the on-device model(s) post-adaptation can then utilize the training instance(s) to personalize the corresponding model(s) downloaded from the remote database(s). The corresponding model(s) downloaded from the remote database(s) can be different from (e.g., smaller or larger than) the counterpart(s) on which the training instance(s) were utilized pre-adaptation, but the training instance(s) can still be utilized in personalizing the different downloaded on-device model(s).

At block 260, the system assigns corresponding role(s) to each of the assistant devices. In some implementations, assigning the corresponding role(s) includes causing each of the assistant device(s) to download and/or implement engine(s) corresponding to the on-device model(s) that are locally stored at the assistant device. The engine(s) can each utilize corresponding on-device model(s) in performing a corresponding processing role such as performing all or part ASR, performing wake word recognition for at least some wake words, performing warm word recognition for certain warm words, and/or performing authentication. In some implementations, one or more of the processing role(s) are performed only at the direction of a lead device of the group of assistant devices. For example, an NLU processing role performed by a given device utilizing on-device NLU model(s) may only be performed responsive to a lead device transmitting, to the given device, corresponding text for NLU processing and/or a specific command to cause the NLU processing to take place. As another example, a warm word(s) monitoring processing role, performed by a given device utilizing an on-device warm cue(s) engine and on-device warm cue(s) model(s), may only be performed responsive to a lead device transmitting, to the given device, a command to cause the warm words processing to take place. For example, a lead device can cause the given device to monitor for a spoken occurrence of a "stop" warm word responsive to an alarm sounding at the lead device or another device of the group. In some implementations, one or more processing role(s) can be performed, at least selectively, independent of any direction from a lead assistant device. For example, a wake cue(s) monitoring role, performed by a given device utilizing an on-device wake cue(s) engine and on-device wake cue(s) model(s), can be performed continuously, unless explicitly disabled by a user. As another example, a warm cue(s) monitoring role, performed by a given device utilizing an on-device warm cue(s) engine and on-device warm cue(s) model(s), can be performed continuously, or based on a condition for the monitoring being detected locally at the given device.

At block 262, the system causes subsequent spoken utterances, detected at one or more of the device(s) of the group, to be cooperatively locally processed at the assistant devices of the group according to their roles. Various non-limiting examples of such cooperative processing are described herein. For example, examples are described with reference to FIGS. 1B1, 1B2, 1B3, 1C, and 1D.

At block 264, the system determines whether there has been any alteration to the group, such as an addition of a device to the group, removal of a device from the group, or a disbanding of the group. If not, the system continues to perform block 262. If so, the system proceeds to block 266.

At block 266, the system determines if the alteration to the group has led to one or more assistant devices, that were in the group, now being solo (i.e., no longer assigned to a group). If so, the system proceeds to block 268 and causes each of the solo devices to locally store the pre-grouping on-device model(s) and assume its pre-grouping on-device processing roles. Put another way, if a device is no longer in the group, it can be caused to revert back to the state it was in prior to the adaptation(s) being performed responsive to it being included in the group. In these and other manners, after reverting back to the state the solo device can functionally process various assistant requests operating in a solo capacity. Prior to reverting back to the state, the solo device may have been unable to functionally process any assistant requests, or at least a lesser quantity of assistant requests than it would have prior to reverting back to the state.

At block 270, the system determines whether there are two or more devices remaining in the altered group. If so, the system proceeds back to block 254 and performs another iteration of blocks 254, 256, 258, 260, and 262 based on the altered group. For example, if the altered group includes an additional assistant device without losing any of the previous assistant devices of the group, the adaptations can be made in consideration of the additional processing capabilities of the additional assistant device. If the decision at block 270 is no, the group has been disbanded and the system proceeds to block 272 where the method 200 ends (until another group is generated).

FIG. 3 is a flowchart illustrating an example method 300 that can be implemented by each of multiple assistant devices in a group, in adapting on-device model(s) and/or processing role(s) of assistant devices in the group. While operations of method 300 are shown in a particular order, this is not meant to be limiting. One or more operations may be reordered, omitted or added.

The operations of the method 300 are one particular example of method 200 that can be performed by each of the assistant devices in a group. Accordingly, the operations are described with reference to an assistant device performing the operations, such as one or more of the assistant clients 120A-D of FIG. 1. Each of the assistant devices in a group can perform method 300 responsive to receiving input that indicates it has been included in a group.

At block 352, the assistant device receives a grouping indication that indicates it has been included in a group. At block 352, the assistant device also receives identifier(s) of the other assistant device(s) that are in the group. Each identifier can be, for example, a MAC address, an IP address, a label assigned to the device (e.g., use assigned in a device topology), a serial number, or other identifier.

At optional block 354, the assistant device transmits data to other assistant device(s) of the group. The data is transmitted to the other devices using the identifier(s) received at block 352. Put another way, the identifier(s) can be network addresses or can be utilized to find network addresses to which to transmit the data. The transmitted data can include one or more processing values described herein, another device identifier, and/or other data.

At optional block 356, the assistant device receives the data transmitted by other device(s) at block 354.

At block 358, the assistant device determines, based on the data optionally received at block 356 or the identifier(s) received at block 352, whether it is the lead device. For example, a device can select itself as a leader if its own identifier is the lowest (or, alternately, the highest) value as compared to the other identifier(s) received at block 352. As another example, a device can select itself as a leader if its processing value(s) exceed those of all other processing value(s) received in data at optional block 356. Other data can be transmitted at block 354 and received at block 356, and such other data can likewise enable an objective determination, at the assistant device, of whether it should be a leader. More generally, at block 358 the assistant device can utilize one or more objective criteria in determining whether it should be the lead device.

At block 360, the assistant device determines whether, at block 358, it was determined to be the lead device. Assistant device(s) that are not determined to be the lead device will then proceed down the "no" branch off of block 360. The assistant device that is determined to be the lead device will proceed down the "yes" branch off block 360.

In the "yes" branch, the assistant device, at block 360, the assistant device utilizes received processing capabilities, from other assistant device(s) in the group, as well as its own processing capabilities, in determining a collective set of on-device models for the group. The processing capabilities can be transmitted by other assistant device(s) to the lead device at optional block 354 or at block 370 (described below) when optional block 354 is not performed or the data of block 354 does not include processing capabilities. In some implementations, block 362 can share one or more aspects in common with block 256 of method 200 of FIG. 2. For example, in some implementations block 362 can also include considering past usage data in determining the collective set of on-device models.

At block 364, the assistant device transmits, to each of the other assistant device(s) of the group, a respective indication of on-device model(s), of the collective set, that the other assistant device is to download. The assistant device can also optionally, at block 364, transmit, to each of the other assistant device(s) of the group, a respective indication of processing role(s) to be performed by the assistant device utilizing the on-device model(s).

At block 366, the assistant device downloads and stores the on-device model(s), of the set, that are assigned to the assistant device. In some implementations, blocks 364 and 366 can share one or more aspects in common with block 258 of method 200 of FIG. 2.

At block 368, the assistant device coordinates cooperative processing of assistant requests, including utilizing its own on-device model(s) in performing portion(s) of the cooperative processing. In some implementations, block 368 can share one or more aspects in common with block 262 of method 200 of FIG. 2.

Turning now to the "no" branch, at optional block 370, the assistant device transmits its processing capabilities to the lead device. Block 370 can be omitted when, for example, block 354 is performed and the processing capabilities are included in data transmitted at block 354.

At block 372, the assistant device receives, from the lead device, an indication of on-device model(s) to download and optionally an indication of processing role(s).

At block 374, the assistant device downloads and stores the on-device model(s) reflected in the indication of the on-device model(s) received at block 372. In some implementations, blocks 372 and 374 can share one or more aspects in common with block 258 of method 200 of FIG. 2.

At block 376, the assistant device utilizes its on-device models in performing portion(s) of cooperative processing of assistant requests. In some implementations, block 376 can share one or more aspects in common with block 262 of method 200 of FIG. 2.

Figure 4:
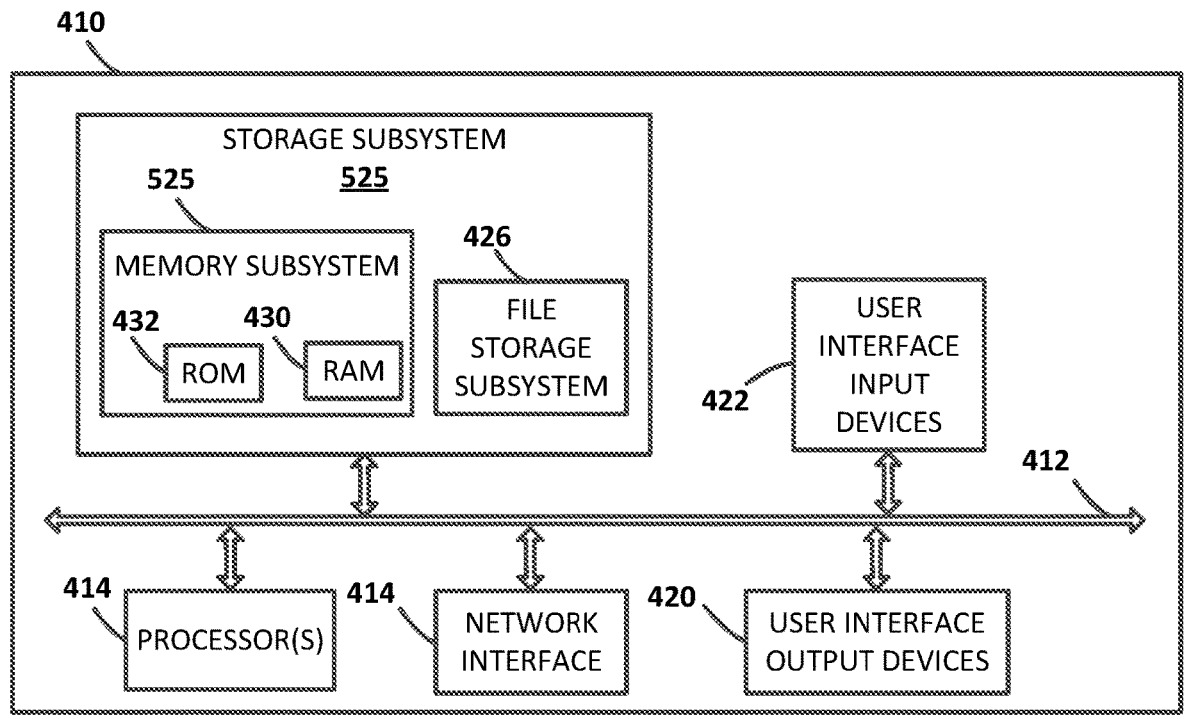
FIG. 4 illustrates an example architecture of a computing device.

FIG. 4 is a block diagram of an example computing device 410 that may optionally be utilized to perform one or more aspects of techniques described herein. In some implementations, one or more of an assistant device, and/or other component(s) may comprise one or more components of the example computing device 410.

Computing device 410 typically includes at least one processor 414 which communicates with a number of peripheral devices via bus subsystem 412. These peripheral devices may include a storage subsystem 425, including, for example, a memory subsystem 425 and a file storage subsystem 426, user interface output devices 420, user interface input devices 422, and a network interface subsystem 416. The input and output devices allow user interaction with computing device 410. Network interface subsystem 416 provides an interface to outside networks and is coupled to corresponding interface devices in other computing devices.

User interface input devices 422 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 410 or onto a communication network.

User interface output devices 420 may include a display subsystem, a printer, a fax machine, or non-visual displays such as audio output devices. The display subsystem may include a cathode ray tube ("CRT"), a flat-panel device such as a liquid crystal display ("LCD"), a projection device, or some other mechanism for creating a visible image. The display subsystem may also provide non-visual display such as via audio output devices. In general, use of the term "output device" is intended to include all possible types of devices and ways to output information from computing device 410 to the user or to another machine or computing device.

Storage subsystem 425 stores programming and data constructs that provide the functionality of some or all of the modules described herein. For example, the storage subsystem 425 may include the logic to perform selected aspects of one or more of the methods described herein, and/or to implement various components depicted herein.

These software modules are generally executed by processor 414 alone or in combination with other processors. Memory 425 used in the storage subsystem 425 can include a number of memories including a main random access memory ("RAM") 430 for storage of instructions and data during program execution and a read only memory ("ROM") 432 in which fixed instructions are stored. A file storage subsystem 426 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 426 in the storage subsystem 425, or in other machines accessible by the processor(s) 414.

Bus subsystem 412 provides a mechanism for letting the various components and subsystems of computing device 410 communicate with each other as intended. Although bus subsystem 412 is shown schematically as a single bus, alternative implementations of the bus subsystem may use multiple busses.

Computing device 410 can be of varying types including a workstation, server, computing cluster, blade server, server farm, or any other data processing system or computing device. Due to the ever-changing nature of computers and networks, the description of computing device 410 depicted in FIG. 4 is intended only as a specific example for purposes of illustrating some implementations. Many other configurations of computing device 410 are possible having more or fewer components than the computing device depicted in FIG. 4.

In situations in which the systems described herein collect personal information about users (or as often referred to herein, "participants"), or may make use of personal information, the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method is provided that includes generating an assistant device group of disparate assistant devices. The disparate assistant devices include at least a first assistant device and a second assistant device. At a time of generating the group the first assistant device includes a first set of locally stored on-device models utilized in locally processing assistant requests directed to the first assistant device. Further, at the time of generating the group the second assistant device includes a second set of locally stored on-device models utilized in locally processing assistant requests directed to the second assistant device. The method further includes determining, based on corresponding processing capabilities for each of the disparate assistant devices of the assistant device group, a collective set of locally stored on-device models for utilization in cooperatively locally processing assistant requests directed to any of the disparate assistant devices of the assistant device group. The method further includes, in response to generating the assistant device group: causing each of the disparate assistant devices to locally store a corresponding subset of the collective set of locally stored on-device models, and assigning one or more corresponding processing roles to each of the disparate assistant devices of the assistant device group. Each of the processing roles utilizes one or more corresponding of the locally stored on-device models. Further, causing each of the disparate assistant devices to locally store the corresponding subset includes causing the first assistant device to purge one or more first on-device models of the first set to provide storage space for the corresponding subset locally stored on the first assistant device and causing the second assistant device to purge one or more second on-device models of the second set to provide storage space for the corresponding subset locally stored on the second assistant device. The method further includes subsequent to assigning the corresponding processing roles to each of the disparate assistant devices of the assistant device group: detecting, via microphones of at least one of the disparate assistant devices of the assistant device group, a spoken utterance, and responsive to the spoken utterance being detected via the microphones of the assistant device group, causing the spoken utterance to be cooperatively locally processed by the disparate assistant devices of the assistant device group and utilizing their corresponding processing roles.

These and other implementations of the technology disclosed herein can optionally include one or more of the following features.

In some implementations, causing the first assistant device to purge one or more first on-device models of the first set includes causing the first assistant device to purge a first device wake word detection model, of the first set, that is utilized in detecting a first wake word. In those implementations, the corresponding subset locally stored on the second assistant device includes a second device wake word detection model that is utilized in detecting the first wake word and assigning the corresponding processing roles includes assigning, to the second assistant device, a first wake word detection role that utilizes the second device wake word detection model in monitoring for occurrence of the first wake word. In some of those implementations, the spoken utterance includes a first wake word followed by an assistant command and, in the first wake word detection role, the second assistant device detects occurrence of the first wake word and causes performance of an additional of the corresponding processing roles in response to detecting the occurrence of the first wake word. In some versions of those implementations, the additional of the corresponding processing roles is performed by the first assistant device, and the second assistant device causes performance of the additional of the corresponding processing roles by transmitting, to the first assistant device, an indication of detection of the first wake word.

In some implementations, the corresponding subset locally stored on the first assistant device includes a first device first wake word detection model that is utilized in detecting one or more first wake words, and excludes any wake word detection model that is utilized in detecting one or more second wake words. In some of those implementations, the corresponding subset locally stored on the second assistant device includes a second device second wake word detection model that is utilized in detecting the one or more second hot words, and excludes any wake word detection model that is utilized in detecting the one or more first wake words. In some versions of those implementations, assigning the corresponding processing roles includes: assigning, to the first assistant device, a first wake word detection role that utilizes the first device wake word detection model in monitoring for occurrence of the one or more first wake word; and assigning, to the second assistant device, a second wake word detection role that utilizes the second device wake word detection model in monitoring for occurrence of the one or more second wake words.

In some implementations, the corresponding subset locally stored on the first assistant device includes a first language speech recognition model that is utilized in performing recognition of speech in a first language, and excludes any speech recognition model that is utilized in recognizing speech in a second language. In some of those implementations, the corresponding subset locally stored on the second assistant device includes a second language speech recognition model that is utilized in performing recognition of speech in a second language, and excludes any speech recognition model that is utilized in recognizing speech in the second language. In some versions of those implementations, assigning the corresponding processing roles includes: assigning, to the first assistant device, a first language speech recognition role that utilizes the first language speech recognition model in performing recognition of speech in the first language; and assigning, to the second assistant device, a second language speech recognition role that utilizes the second language speech recognition model in performing recognition of speech in the second language.

In some implementations, the corresponding subset locally stored on the first assistant device includes a first portion of a speech recognition model that is utilized in performing a first portion of recognition of speech, and excludes a second portion of the speech recognition model. In some of those implementations, the corresponding subset locally stored on the second assistant device includes the second portion of the speech recognition model that is utilized in performing the second portion of recognition of speech, and excludes the first portion of the speech recognition model. In some versions of those implementations, assigning the corresponding processing roles includes: assigning, to the first assistant device, a first portion of a language speech recognition role that utilizes the first portion of the speech recognition model in generating a corresponding embedding of corresponding speech, and transmitting the corresponding embedding to the second assistant device; and assigning, to the second assistant device, a second language speech recognition role that utilizes the corresponding embedding, from the first assistant device, and the second language speech recognition model in generating a corresponding recognition of the corresponding speech.

In some implementations, the corresponding subset locally stored on the first assistant device includes a speech recognition model that is utilized in performing a first portion of recognition of speech. In some of those implementations, assigning the corresponding processing roles includes: assigning, to the first assistant device, a first portion of a language speech recognition role that utilizes the speech recognition model in generating output, and transmitting the corresponding output to the second assistant device; and assigning, to the second assistant device, a second language speech recognition role that performs a beam search, on the corresponding output from the first assistant device, in generating a corresponding recognition of the corresponding speech.

In some implementations, the corresponding subset locally stored on the first assistant device includes one or more pre-adaptation natural language understanding models that are utilized in performing semantic analysis of natural language input, and the one or more initial natural language understanding models occupy a first quantity of local disk space at the first assistant device. In some of those implementations, the corresponding subset locally stored on the first assistant device includes one or more post-adaptation natural language understanding models that include at least one additional natural language understanding model that is in addition to the one or more initial natural language understanding models, and that occupy a second quantity of the local disk space at the first assistant device, the second quantity being greater than the first quantity.

In some implementations, the corresponding subset locally stored on the first assistant device includes a first device natural language understanding model that is utilized in semantic analysis for one or more first classifications, and excludes any natural language understanding model that is utilized in semantic analysis for a second classification. In some of those implementations, the corresponding subset locally stored on the second assistant device includes a second device natural language understanding model that is utilized in semantic analysis for at least the second classification.

In some implementations, the corresponding processing capabilities for each of the disparate assistant devices of the assistant device group include a corresponding processor value based on capabilities of one or more on-device processors, a corresponding memory value based on size of on-device memory, and/or a corresponding disk space value based on available disk space.

In some implementations, generating the assistant device group of disparate assistant devices is in response to user interface input that explicitly indicates a desire to group the disparate assistant devices.

In some implementations, generating the assistant device group of disparate assistant devices is performed automatically in response to determining the disparate assistant devices satisfy one or more proximity conditions relative to one another.

In some implementations, generating the assistant device group of disparate assistant devices is performed responsive to affirmative user interface input received in response to a recommendation to create the assistant device group, and the recommendation is generated automatically in response to determining the disparate assistant devices satisfy one or more proximity conditions relative to one another.

In some implementations, the method further includes, subsequent to assigning the corresponding processing roles to each of the disparate assistant devices of the assistant device group: determining that the first assistant device is no longer in the group and, in response to determining that the first assistant device is no longer in the group, causing the first assistant device to supplant the corresponding subset, locally stored on the first assistant device, with the first on-device models of the first set.

In some implementations, determining the collective set is further based on usage data that reflects past usage at one or more of the assistant devices of the group.

In some of those implementations, determining the collective set includes: determining, based on the corresponding processing capabilities for each of the disparate assistant devices of the assistant device group, multiple candidate sets that are each capable of being collectively locally stored and collectively locally utilized by the assistant devices of the group; and selecting, based on the usage data, the collective set from the candidate sets.

In some implementations, a method implemented by one or more processors of an assistant device is provided. The method includes, in response to determining that the assistant device is included in a group of assistant devices that includes the assistant device and one or more additional assistant devices, determining that the assistant device is a lead device for the group. The method further includes, in response to determining that the assistant device is the lead device for the group, determining, based on processing capabilities of the assistant device and based on received processing capabilities for each of the one or more additional assistant devices: a collective set of on-device models for utilization in cooperatively locally processing assistant requests directed to any of the disparate assistant devices of the assistant device group; and for each of the on-device models, a corresponding designation of which of the assistant devices of the group will locally store the on-device model. The method further includes, in response to determining that the assistant device is the lead device for the group: communicating with the one or more additional assistant devices to cause the one or more additional assistant devices to each locally store any of the on-device models having the corresponding designation for the additional assistant device; locally storing, at the assistant device, the on-device models having the corresponding designation for the assistant device; and assigning one or more corresponding processing roles, for cooperative local processing of assistant requests directed to the group, to each of the assistant devices of the group.

These and other implementations of the technology disclosed herein can optionally include one or more of the following features.

In some implementations, determining that the assistant device is the lead device for the group includes: comparing the processing capabilities of the assistant device to the received processing capabilities for each of the one or more additional assistant devices; and determining that the assistant device is the lead device for the group based on the comparing.

In some implementations, the group of assistant devices is created in response to user interface input that explicitly indicates a desire to group the assistant devices.

In some implementations, the method further includes, in response to determining that the assistant device is the lead device for the group and in response to receiving an assistant request at one or more of the assistant devices of the group: coordinating cooperative local processing, of the assistant request, using the corresponding processing roles assigned to the assistant devices.

In some implementations, a method implemented by one or more processors of an assistant device is provided and includes determining that an assistant device has been removed from a group of disparate assistant devices. The group is one that had included the assistant device and at least one additional assistant device. At a time of the assistant device being removed from the group, the assistant device locally stored a set of on-device models, and the set of on-device models were insufficient for fully processing, locally at the assistant device, a spoken utterance that is directed to an automated assistant. The method further includes, in response to determining that the assistant device has been removed from the group of assistant devices: causing the assistant device to purge one or more of the on-device models of the set, and to retrieve and locally store one or more additional on-device models. Subsequent to retrieving and locally storing the one or more additional on-device models the assistant device, the one or more additional on-device models and any remaining of the on-device models of the set can be utilized in fully processing, locally at the assistant device, the spoken utterance that is directed to the automated assistant.

What is claimed is:

1. A method implemented by one or more processors, the method comprising:
   generating an assistant device group of disparate assistant devices, the disparate assistant devices including at least a first assistant device and a second assistant device, wherein, at a time of generating the group:
      the first assistant device includes a first set of locally stored on-device models utilized in locally processing assistant requests directed to the first assistant device, and
      the second assistant device includes a second set of locally stored on-device models utilized in locally processing assistant requests directed to the second assistant device;
   determining, based on corresponding processing capabilities for each of the disparate assistant devices of the assistant device group, a collective set of stored on-device models for utilization in cooperatively processing assistant requests directed to any of the disparate assistant devices of the assistant device group, wherein the collective set of stored on-device models includes a first subset of on-device models and a second subset of on-device models, wherein the first subset includes at least one on-device model not included in the second subset and the second subset includes at least one on-device model not included in the first subset;
   in response to generating the assistant device group:
      causing each of the disparate assistant devices to locally store a corresponding subset of the collective set of stored on-device models, wherein the first subset is locally stored on the first assistant device and the second subset is locally stored on the second assistant device, wherein causing the first assistant device to locally store the first subset includes causing the first assistant device to purge one or more first on-device models of the first set to provide storage space for the first subset locally stored on the first assistant device, and wherein causing the second assistant device to locally store the second subset includes causing the second assistant device to purge one or more second on-device models of the second set to provide storage space for the second subset locally stored on the second assistant device, wherein the first subset locally stored on the first assistant device omits the one or more first on-device models that were purged, wherein the second subset locally stored on the second assistant device omits the one or more second on-device models that were purged, and wherein the first subset, locally stored on the first assistant device, includes a given on-device model that is more accurate and/or more robust than a given counterpart on-device model included among the one or more first on-device models that were purged;

assigning one or more corresponding processing roles to each of the disparate assistant devices of the assistant device group, each of the processing roles utilizing one or more corresponding of the locally stored on-device models and a given one of the processing roles being assigned to the first assistant device exclusively; and subsequent to generating the assistant device group and subsequent to assigning the corresponding processing roles to each of the disparate assistant devices of the assistant device group:

detecting, via microphones of at least one of the disparate assistant devices of the assistant device group, a spoken utterance, and responsive to the spoken utterance, causing the spoken utterance to be cooperatively processed by the disparate assistant devices of the assistant device group and utilizing their corresponding processing roles.

2. The method of claim 1, wherein causing the first assistant device to purge one or more first on-device models of the first set comprises causing the first assistant device to purge a first device wake word detection model, of the first set, that is utilized in detecting a first wake word;

wherein the second subset locally stored on the second assistant device comprises a second device wake word detection model that is utilized in detecting the first wake word;

wherein assigning the corresponding processing roles comprises assigning, to the second assistant device, a first wake word detection role that utilizes the second device wake word detection model in monitoring for occurrence of the first wake word;

wherein the spoken utterance comprises a first wake word followed by an assistant command; and wherein, in the first wake word detection role, the second assistant device detects occurrence of the first wake word and causes performance of an additional of the corresponding processing roles in response to detecting the occurrence of the first wake word.

3. The method of claim 2, wherein the additional of the corresponding processing roles is performed by the first assistant device, and wherein the second assistant device causes performance of the additional of the corresponding processing roles by transmitting, to the first assistant device, an indication of detection of the first wake word.

4. The method of claim 1, wherein the first subset locally stored on the first assistant device comprises a first device first wake word detection model that is utilized in detecting one or more first wake words, and excludes any wake word detection model that is utilized in detecting one or more second wake words;

wherein the second subset locally stored on the second assistant device comprises a second device second wake word detection model that is utilized in detecting the one or more second hot words, and excludes any wake word detection model that is utilized in detecting the one or more first wake words;

wherein assigning the corresponding processing roles comprises assigning, to the first assistant device, a first wake word detection role that utilizes the first device wake word detection model in monitoring for occurrence of the one or more first wake word; and wherein assigning the corresponding processing roles comprises assigning, to the second assistant device, a second wake word detection role that utilizes the second device wake word detection model in monitoring for occurrence of the one or more second wake words.

5. The method of claim 1, wherein the first subset locally stored on the first assistant device comprises a first language speech recognition model that is utilized in performing recognition of speech in a first language, and excludes any speech recognition model that is utilized in recognizing speech in a second language;

wherein the second subset locally stored on the second assistant device comprises a second language speech recognition model that is utilized in performing recognition of speech in a second language, and excludes any speech recognition model that is utilized in recognizing speech in the first language;

wherein assigning the corresponding processing roles comprises assigning, to the first assistant device, a first language speech recognition role that utilizes the first language speech recognition model in performing recognition of speech in the first language; and wherein assigning the corresponding processing roles comprises assigning, to the second assistant device, a second language speech recognition role that utilizes the second language speech recognition model in performing recognition of speech in the second language.

6. The method of claim 1, wherein the first subset locally stored on the first assistant device comprises a first portion of a speech recognition model that is utilized in performing a first portion of recognition of speech, and excludes a second portion of the speech recognition model;

wherein the second subset locally stored on the second assistant device comprises the second portion of the speech recognition model that is utilized in performing the second portion of recognition of speech, and excludes the first portion of the speech recognition model;

wherein assigning the corresponding processing roles comprises assigning, to the first assistant device, a first portion of a language speech recognition role that utilizes the first portion of the speech recognition model in generating a corresponding embedding of corresponding speech, and transmitting the corresponding embedding to the second assistant device; and wherein assigning the corresponding processing roles comprises assigning, to the second assistant device, a second language speech recognition role that utilizes the corresponding embedding, from the first assistant device, and the second language speech recognition model in generating a corresponding recognition of the corresponding speech.

7. The method of claim 1, wherein the first subset locally stored on the first assistant device comprises a speech recognition model that is utilized in performing a first portion of recognition of speech;

wherein assigning the corresponding processing roles comprises assigning, to the first assistant device, a first portion of a language speech recognition role that utilizes the speech recognition model in generating output, and transmitting the corresponding output to the second assistant device; and wherein assigning the corresponding processing roles comprises assigning, to the second assistant device, a second language speech recognition role that performs a beam search, on the corresponding output from the first assistant device, in generating a corresponding recognition of the corresponding speech.

8. The method of claim 1, wherein the first subset locally stored on the first assistant device comprises one or more pre-adaptation natural language understanding models that are utilized in performing semantic analysis of natural language input,
wherein the one or more initial natural language understanding models occupy a first quantity of local disk space at the first assistant device; and wherein the first subset locally stored on the first assistant device comprises one or more post-adaptation natural language understanding models that include at least one additional natural language understanding model that is in addition to the one or more initial natural language understanding models,
wherein the one or more post-adaptation natural language understanding models occupy a second quantity of the local disk space at the first assistant device, the second quantity being greater than the first quantity.

9. The method of claim 1, wherein the first subset locally stored on the first assistant device comprises a first device natural language understanding model that is utilized in semantic analysis for one or more first classifications, and excludes any natural language understanding model that is utilized in semantic analysis for a second classification; and wherein the second subset locally stored on the second assistant device comprises a second device natural language understanding model that is utilized in semantic analysis for at least the second classification.

10. The method of claim 1, wherein the corresponding processing capabilities for each of the disparate assistant devices of the assistant device group comprise a corresponding processor value based on capabilities of one or more on-device processors, a corresponding memory value based on size of on-device memory, and a corresponding disk space value based on available disk space.

11. The method of claim 1, wherein generating the assistant device group of disparate assistant devices is in response to user interface input that explicitly indicates a desire to group the disparate assistant devices.

12. The method of claim 1, wherein generating the assistant device group of disparate assistant devices is performed automatically in response to determining the disparate assistant devices satisfy one or more proximity conditions relative to one another.

13. The method of claim 1, further comprising, subsequent to assigning the corresponding processing roles to each of the disparate assistant devices of the assistant device group:

determining that the first assistant device is no longer in the group; and in response to determining that the first assistant device is no longer in the group:

causing the first assistant device to supplant the first subset, locally stored on the first assistant device, with the first on-device models of the first set.

14. The method of claim 1, wherein determining the collective set is further based on usage data that reflects past usage at one or more of the assistant devices of the group.

15. The method of claim 14, wherein determining the collective set comprises:

determining, based on the corresponding processing capabilities for each of the disparate assistant devices of the assistant device group, multiple candidate sets that are each capable of being collectively locally stored and collectively locally utilized by the assistant devices of the group; and selecting, based on the usage data, the collective set from the candidate sets.

16. The method of claim 1, wherein prior to generating the group the first assistant device can process, on its own, a given spoken assistant request, and wherein subsequent to generating the assistant device group and subsequent to assigning the corresponding processing roles to each of the disparate assistant devices of the assistant device group, the first assistant device is incapable of processing the given spoken assistant request on its own.

17. A system, comprising:

a first assistant device;

a second assistant device;

memory storing instructions;

one or more processors operable to execute the instructions to:

generate an assistant device group of disparate assistant devices, the disparate assistant devices including at least the first assistant device and the second assistant device, wherein, at a time of generating the group:

the first assistant device includes a first set of locally stored on-device models utilized in locally processing assistant requests directed to the first assistant device, and the second assistant device includes a second set of locally stored on-device models utilized in locally processing assistant requests directed to the second assistant device;

determine, based on corresponding processing capabilities for each of the disparate assistant devices of the assistant device group, a collective set of stored on-device models for utilization in cooperatively processing assistant requests directed to any of the disparate assistant devices of the assistant device group, wherein the collective set of stored on-device models includes a first subset of on-device models and a second subset of on-device models, wherein the first subset includes at least one on-device model not included in the second subset and the second subset includes at least one on-device model not included in the first subset;

in response to generating the assistant device group:
cause each of the disparate assistant devices to locally store a corresponding subset of the collective set of stored on-device models,
wherein the first subset is locally stored on the first assistant device and the second subset is locally stored on the second assistant device,
wherein causing the first assistant device to locally store the first subset includes causing the first assistant device to purge one or more first on-device models of the first set to provide storage space for the first subset locally stored on the first assistant device and,
wherein causing the second assistant device to locally store the second subset includes causing the second assistant device to purge one or more second on-device models of the second set to provide storage space for the second subset locally stored on the second assistant device,
wherein the first subset locally stored on the first assistant device omits the one or more first on-device models that were purged,
wherein the second subset locally stored on the second assistant device omits the one or more second on-device models that were purged, and
wherein the first subset, locally stored on the first assistant device, includes a given on-device model that is more accurate and/or more robust than a given counterpart on-device model included among the one or more first on-device models that were purged;

assign one or more corresponding processing roles to each of the disparate assistant devices of the assistant device group, each of the processing roles utilizing one or more corresponding of the locally stored on-device models, and a given one of the processing roles being assigned to the first assistant device exclusively; and subsequent to generating the assistant device group and subsequent to assigning the corresponding processing roles to each of the disparate assistant devices of the assistant device group:
detect, via microphones of at least one of the disparate assistant devices of the assistant device group, a spoken utterance, and
responsive to the spoken utterance, cause the spoken utterance to be cooperatively locally processed by the disparate assistant devices of the assistant device group and utilizing their corresponding processing roles.

18. The system of claim 17,
wherein prior to generating the group the first assistant device can process, on its own, a given spoken assistant request, and
wherein subsequent to generating the assistant device group and subsequent to assigning the corresponding processing roles to each of the disparate assistant devices of the assistant device group, the first assistant device is incapable of processing the given spoken assistant request on its own.

19. The system of claim 17,
wherein the first assistant device includes the memory and the one or more processors.

* * * * *